US007408546B2

(12) United States Patent
Serra

(10) Patent No.: US 7,408,546 B2
(45) Date of Patent: Aug. 5, 2008

(54) SYSTEM AND METHOD FOR DISPLAYING AND COMPARING 3D MODELS ("3D MATCHING")

(75) Inventor: Luis Serra, Singapore (SG)

(73) Assignee: Volume Interactions Pte Ltd., Singapore (SG)

( * ) Notice: Subject to any disclaimer, the term of this patent is extended or adjusted under 35 U.S.C. 154(b) by 49 days.

(21) Appl. No.: 10/725,772

(22) Filed: Dec. 1, 2003

(65) Prior Publication Data

US 2004/0249303 A1 Dec. 9, 2004

Related U.S. Application Data

(60) Provisional application No. 60/505,345, filed on Nov. 29, 2002, provisional application No. 60/505,346, filed on Nov. 29, 2002, provisional application No. 60/505,344, filed on Nov. 29, 2002.

(51) Int. Cl.
*G06T 15/00* (2006.01)
(52) U.S. Cl. ........................ 345/419; 345/581
(58) Field of Classification Search ......... 345/418–419, 345/423–424, 427, 629–632, 581
See application file for complete search history.

(56) References Cited

U.S. PATENT DOCUMENTS

| | | | | |
|---|---|---|---|---|
| 5,801,709 | A * | 9/1998 | Suzuki et al. | 345/619 |
| 5,940,068 | A * | 8/1999 | Hasegawa et al. | 345/551 |
| 6,256,040 | B1 * | 7/2001 | Tanaka et al. | 345/421 |
| 6,826,297 | B2 * | 11/2004 | Saito et al. | 382/131 |

OTHER PUBLICATIONS

Kockro, R. et al.: "Planning and Simulation of Neurosurgery in a Virtual Reality Environment" *Neurosurgery*, vol. 46, No. 1, Jan. 2000, pp. 118-137.
Serra, L. et al.: "Multimodal Volume-Based Tumor Neurosurgery Planning in the Virtual Workbench" *First International Conference on Medical Image Computing and Computer-Assisted Intervention MICCAI 98*, MIT, Cambridge MA, Oct. 11-13, 1998, pp. 1007-1016.
Chua et al.: "Volume-Based Tumor Neurosurgery Planning in the Virtual Workbench" Los Alamitos, CA, USA, IEEE Comput. Soc, USA, 1998, pp. 167-173.

* cited by examiner

*Primary Examiner*—Phu K. Nguyen
(74) *Attorney, Agent, or Firm*—Kramer Levin Naftalis & Frankel LLP; Aaron S. Haleva, Esq.

(57) ABSTRACT

A system and method for displaying 3D data are presented. The method involves subdividing a 3D display region into two or more display subregions, and assigning a set of display rules to each display subregion. Visible portions of a 3D data set in each display subregion are displayed according to the rules assigned to that display subregion. In an exemplary embodiment of the present invention the boundaries of the display regions, the display rules for each display subregion, and the 3D data sets assigned to be displayed in each display subregion can be set by a user, and are interactively modifiable by a user during the display. In exemplary embodiments of the invention the same 3D data can be displayed in each display subregion, albeit using different display rules. Alternatively, in other exemplary embodiments of the present invention, a different 3D data set can be displayed in each display subregion. In still other exemplary embodiments of the present invention, the various 3D data sets can comprise scans of the same object or body using different sensing modalities.

32 Claims, 28 Drawing Sheets

SYSTEM AND METHOD FOR DISPLAYING AND COMPARING 3D MODELS ("3D MATCHING")

CROSS REFERENCE TO OTHER APPLICATIONS

This application claims the benefit of U.S. Provisional Patent Applications 60/505,345, 60/505,346 and 60/505,344, each filed on Nov. 29, 2002, and all under common assignment herewith.

FIELD OF THE INVENTION

The present invention relates to the field of visual presentation of three-dimensional objects modeled in a computer, whether stored as volume raster data such as, for example, CT scans, or as geometric constructs such as, for example, objects built from lines, polygons and other primitives.

BACKGROUND OF THE INVENTION

In the early 1970s traditional projected X-ray pictures were supplemented by computerized tomography, which digitally reconstructed a set of slices from multi-directional views (as from a microtome). This led to much research being directed towards methods of presenting such information visually in 3D, whether by volume rendering the data directly, using various algorithms, or by surface extraction to represent such shapes as a liver or a tumor by a geometric structure composed of polygons or triangles, which on many computers can be colored, lit and displayed more quickly. Soon after the appearance of CT other 3D imaging modalities were developed, such as, for example, Magnetic Resonance (MR) imaging, Positron Emission Tomography (PET), single-photon emission computed tomography (SPECT) and ultrasound (US), which first presented single slices under user control of position and angle, later integrated into the creation of 3D data sets. Beyond the realm of medical applications, other modalities such as seismography and electromagnetic geological sensing are also important sources of volume data, as well as are data acquisition technologies in numerous other fields.

Different modalities yield different information. For example, in medical diagnostics, CT shows bone more clearly than does MR, but MR can identify tumor tissue. This led to a desire for multi-modal imaging so that, for example, a surgeon can see where a tumor is relative to features on the bone that can guide her in orienting herself and navigating through the patient's body. The first requirement for such multi-modality is registration, which brings the 3D images into alignment. Registration is a non-trivial problem, since not only does each modality report in a different system of (x, y, z) coordinates, depending on the sensing device and its location, but often each has different warping of the data, so that straight lines in one data set often correspond to curves in another. Warping is intrinsic in some modalities. For example, the ideal linearly-varying magnetic field strength for magnetic resonance imaging is mathematically impossible in a finite device. To a considerable extent such warping is automatically compensated within the scanner for the controlled environment of medical devices, but this is less true for seismic scans. Medically a perfect match may not exist, if one data set is from a reference brain and the other is from a patient distorted by a tumor, and one has an optimal matching problem. For simplicity, situations are addressed herein in which the registration problem for two or more 3D data sets is assumed to have been solved.

An additional hurdle is that of image fusion, which displays the combined multi-modal information to a user. Whereas registration has an observer-independent criterion of correctness, i.e., data associated with the same coordinates should describe properties at the same physical location in the patient, image fusion raises questions of perceptual psychology. There may be a large variety of data, including not only the numbers in the original scan but derived quantities such as porosity, as well as 3D objects of other kinds, such as extracted surfaces, center curves of blood vessels, possible implants, etc., to display. Hence the term data modalities, as distinct from sensing modalities, is utilized herein to include such additional objects of attention. For a surface constructed, for example, as the boundary of a particular type of tissue, registration is not a concern inasmuch as the surface was constructed with reference to the coordinates of the volume data set from which it was extracted. Nonetheless, the different information conveyed by surface rendering of one and a volume rendering of the other require coordination in display as well as in a user's mind. It follows from comparison of the information to be displayed and the number of pointwise display elements (usually red, green, blue and transparency) that it is simply impractical to display all data at every point.

A shader is a rule assigning display properties to particular values of a data set. It determines attributes such as, for example, color, transparency, simulated light reflection properties, etc. at each point, and is normally chosen so as to make the differences within and between data sets perceptible, such as, for example, the position, size and shape of a particular region of interest, e.g., a region occupied by cancer cells or by petroleum shale. Many alternative shader choices may be useful for the same data set. For example, a rule such as "make everything except bone transparent and hence invisible" results in the display of the skull of a scanned patient as if it was removed from the surrounding flesh, while a rule such as "show all points with values high enough to be tissue and not empty air" displays the skin surface as the boundary of an opaquely rendered region. As well, since hair data often average to a density value which is hard to distinguish from noise, such displays commonly make a patient appear bald. FIG. 1 is an illustration of the fact that for a complex 3D object various different renderings are possible, each with advantages and disadvantages. In the example of FIG. 1, two different renderings 101 and 102 may reveal different features: in rendering 101 a surface or solid structure 110 with a faintly visible core 111, or as in rendering 102, a visible core 120 with other parts of the model suppressed. Thus, the choice of shader is another source of co-registered views, without input from various multiple sensing modalities, whose mutual relations may be important to a user.

One possible multimodal display method is to allow different data modalities to control different color components of the displayed image, in what is termed a "false color" display. For instance, CT-reported density (high in bone) might control the red component, while MR values (with settings adjusted to tumor sensitivity) might control the green. However, it is a fact of psychophysics that red and green light combine to create a distinct sensation of yellow in a viewer's perspective, as if there were a light source at a single yellow frequency intermediate between red and green. Notwithstanding that fact, users do not directly perceive yellow as "red and green combined." Therefore, an association of yellow with "cancerous bone" must be learned in a particular application, rather than occurring naturally based upon her knowledge that "red is bone" and "green is cancer". False color thus places new and different training demands on a user for each application, rather than being a solution which is transferable across various 3D data display environments.

Further, since human eyes are limited to three classes of color receptors, false color cannot fully represent four simultaneous data modalities. It is therefore necessary in many situations to switch between displays of different data modalities, while retaining, to the extent possible, the context provided by the mutual registration of all the modalities. This need is addressed by the present invention.

SUMMARY OF THE INVENTION

A system and method for displaying 3D data are presented. The method involves subdividing a 3D display region into two or more display subregions, and assigning a set of display rules to each display subregion. Visible portions of a 3D data set in each display subregion are displayed according to the rules assigned to that display subregion. In an exemplary embodiment of the present invention the boundaries of the display regions, the display rules for each display subregion, and the 3D data sets assigned to be displayed in each display subregion can be set by a user, and are interactively modifiable by a user during the display. In exemplary embodiments of the invention the same 3D data can be displayed in each display subregion, albeit using different display rules. Alternatively, in other exemplary embodiments of the present invention, a different 3D data set can be displayed in each display subregion. In still other exemplary embodiments of the present invention, the various 3D data sets can comprise scans of the same object or body using different sensing modalities.

DETAILED DESCRIPTION OF THE INVENTION

The methods of the present invention are implemented in 3D data display systems. For illustration purposes certain relevant fundamentals of such systems will be introduced so as to make the description of the invention more readily understandable.

A crop box is a boundary surface (often rectangular) limiting the region in which 3D data are rendered. It is to be distinguished from a clipping box, which has a similar function and may coexist in the same display environment, by the fact that the crop box is fixed in model space (u, v, w) and thus moves with the model display as a user rotates or translates that display, continuing to contain visible renderings for the same points in the model or models shown. Modifying its relation to the model space is a separate act. A clipping box, by contrast, has a position defined relative to the display (i.e., fixed in display space (x, y, z)), and moving the model will transfer parts of the model into and out of visibility.

According to the present invention, a parameterized subdivision of a crop box volume into display subsets is constructed, assigning to each subset a system of rules as to which data model is to be rendered and in what way, with respect to all model points whose position (p, q, r) in that model's specified coordinates correspond under registration to (u, v, w) model space coordinates lying within the display subset. Such a system of rules may specify, for example, that for a particular display subset only one model is to be rendered, or several are (so long as they are part of the co-registered set) with appropriate rules for blending or otherwise combining them. Similarly, where there are several shaders or several shader settings of interest, the same data set may be assigned to different display subsets, each using different shaders or shader settings to render the data set. For example, in one subset only bone may be made visible, while in another only brain tissue. Or, by appropriate blending, one subset may show bone with a near-transparent suggestion of soft brain tissue shape around it, while another shows brain with a hint of bone location. Such blending may be useful in the following example scenario. A surgeon wishing to concentrate on the properties of brain tissue may nevertheless wish to relate it to nearby bone for navigational purposes, so that a procedure on the physical brain modifies the geometrically correct, anatomically correct and medically appropriate piece of tissue.

Figure 1:
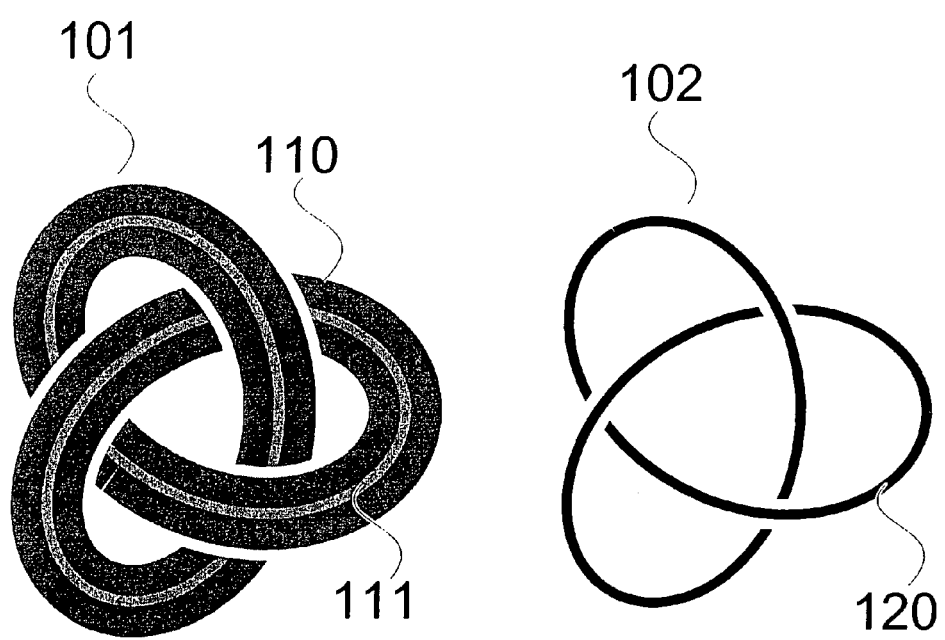
FIG. 1 shows exemplary stylized representations of two exemplary display images generated from a common data object, but obtained by either different scanning modalities or via the use of different shaders, applied to a single set of 3D scan data according to an exemplary embodiment of the present invention.
Figure 2:
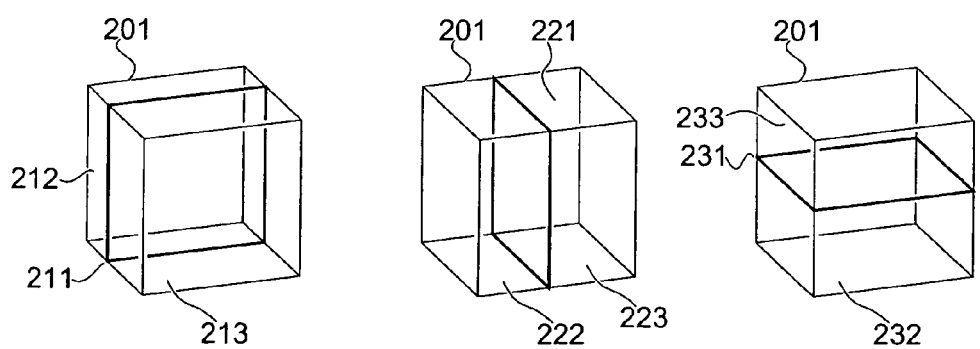
FIG. 2 illustrates exemplary uses of face-parallel planes to subdivide a rectangular region into sub-regions according to an exemplary embodiment of the present invention.
Figure 3A:
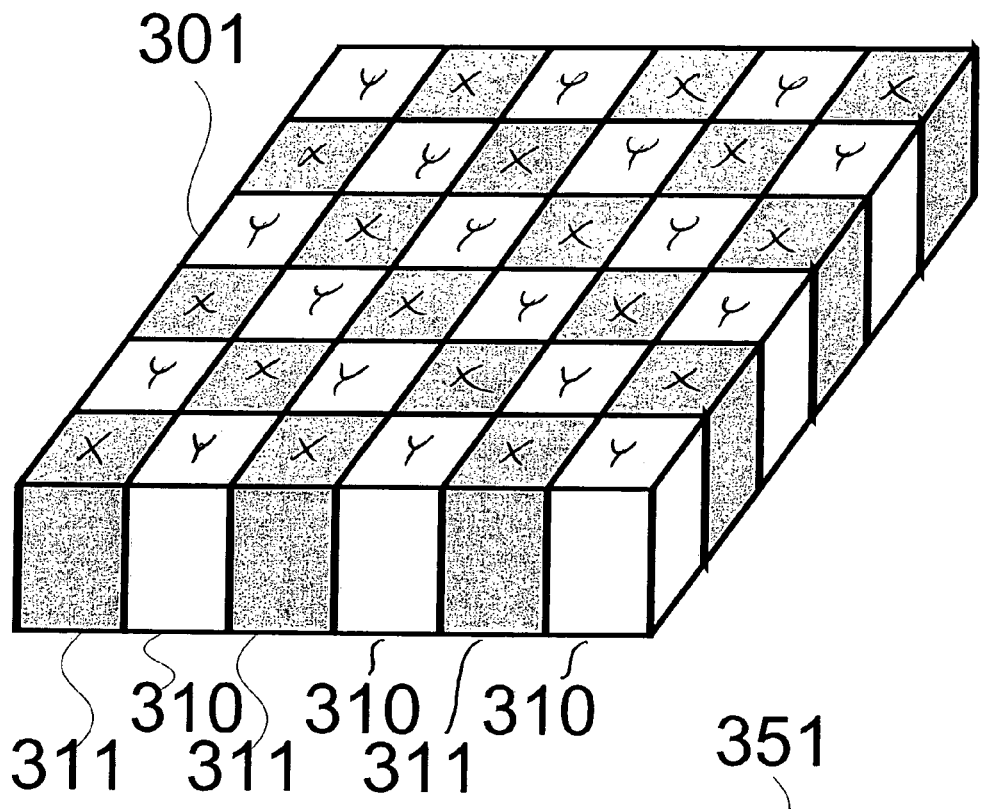
FIGS. 3(a) and 3(b) illustrate an exemplary subdivision of an exemplary display volume into two and three disconnected regions according to an exemplary embodiment of the present invention.
Figure 3B:
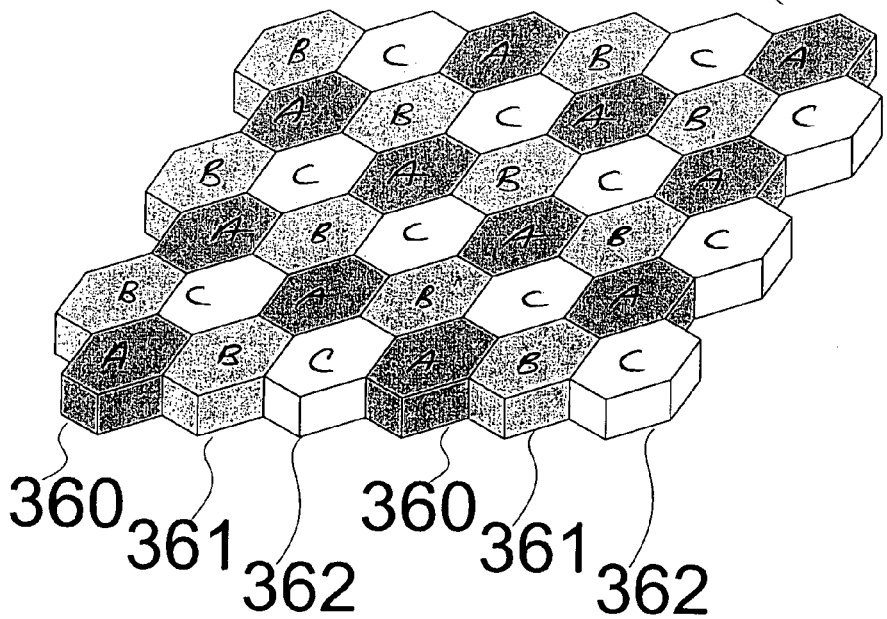

In exemplary embodiments of the present invention, such display subsets can be, for example, volumes, such as, for example, parts of a rectangular crop box separated by a plane which is parallel to one pair of opposing box faces such as is depicted in FIG. 2, or alternatively, having more complex separating sets such as are depicted for example in FIG. 3. In other exemplary embodiments, one or more display subsets may be two-dimensional displaying, for example, an image depending on data values in a planar polygon, or a spherical shell; one-dimensional, sampling the data along lines or curves; or even zero-dimensional, consisting of one or more isolated points.

In an exemplary embodiment a user may modify the shader associated with a particular subset, or the rules governing blending of different data set values, by using interactive objects as may be known in the art.

As well, in an exemplary embodiment, a user may modify the decomposition of the crop box into display subsets in a variety of ways, according to the parameterization and the interface means available in a particular system. For example, if in a particular embodiment a subset is defined as the points to one side of a particular plane, that plane may be moved. If translation is the only motion allowed for the plane in that embodiment, its position may be controlled by a slider type object. Alternatively, by using more complex controls, a user may rotate, or modify such plane by adjusting parameters that specify other features than position: for example, modifying the dimensions of the repeating blocks from which subdivisions like those in FIG. 3 are constructed. Any such parameter may again be controlled by a variety of interface objects as known in the art.

The ability to move and modify the crop box decomposition gives a user a powerful way to compare as well as mentally fuse the information from disparate sensing modalities or shaders, by paying attention to location and noting the changes that occur in that specific point or small region as the data source or shader changes.

For illustration purposes the present invention shall be described using the following exemplary scenarios and using the following notational conventions and terms of art. A 3D data display system is loaded with two or more three-dimensional data sets, each defined in terms of an 'internal' co-ordinate system (p, q, r) specific to that set. It is noted that the same point in physical space may correspond to different (p, q, r) values in different data sets. Each data set is provided with a transformation that specifies for each (p, q, r) in the data set a corresponding point in a shared model space where positions are denoted by co-ordinates (u, v, w). The assignment of such transformations to a common system (u, v, w) corresponds to a solution of the registration problem described above. Also, the display system is equipped to render these objects when a transformation from model space coordinates (u, v, w) to display coordinates (x, y, z) that are specified relative to the hardware, to the user's viewpoint, etc. The region of model space so displayed may be limited by a crop box controlled by a user. In a display space described by (x, y, z) co-ordinates, accompanying control objects as well as other data objects may also be placed, without being limited to the region inside the crop box. By controlling the crop box a user can (a) move it relative to model space coordinates (U, v, w), thus selecting a different region for display of one or more models, can (b) change its size and shape, which also may select a different region for display of one or more models, and can (c) move it in display coordinates (x, y, z) while maintaining a fixed relation to model coordinates (u, v, w). The effect of the latter is to algebraically change the transformation by which model space coordinates (u, v, w) correspond to display coordinates (x, y, z). This is experienced by the user as moving the displayed portion of the model or models by some rotation or translation, providing a different view in the display.

Further, a volume decomposition of model space is understood to mean a finite list of subsets and a computable rule or set of rules that determines to which subset a given point in model space (u, v, w) belongs. A model scene is understood as an assembly of one or more renderable data sets including, but not limited to, volume scans, polygonal surfaces having color and other graphics information, implicit surfaces of the form f(u, v, w)=c where f is a computable function of (u, v, w), straight line segments, spline surfaces and curves, each of which has a transformation from its definitional coordinates (introduced in the above example as (p, q, r)□) to model space coordinates (u, v, w). Where (u, v, w) are used as the coordinates of definition for a model, such a transformation from a data set's definitional coordinates to model space coordinates is given by the identity matrix. The renderable data sets in a model scene are referred to as its models. A rendering decomposition of a model space is thus understood as a volume decomposition together with a model scene and a specification for each subset as to which models (or portions thereof) are to be rendered when they have points within it, and by which shader. A decomposed rendering is a display that implements these specifications, for a given crop box, user viewpoint, display device, and 2D or 3D window.

The means of achieving a decomposed rendering may vary according to the display system and the nature of the data and the shader. For example, volume data to be rendered in a subset defined by planar boundaries, such as a cube or other polyhedron, can be displayed by showing a stack of plane polygonal resamplings of the data, in a technique known as "3D textures" (See, for example, Cabral, B., Cam, B., and Foran, J.: *Accelerated Volume Rendering and Tomographic Reconstruction Using Texture Mapping Hardware*, Proc. ACM/IEEE 1994 Symposium Volume Visualization., (1994) 91-98 and 131). If there are relatively few of these bounding planes, calculating the polygonal boundaries required can be done efficiently. For example, a planar slice of a rectangular block never has more than six edges. If it is guaranteed to be parallel to a face, it has exactly four edges, which are easily computed.

This technique can be used in an exemplary embodiment of the present invention. If a volume subset is more complex, other methods of restricting its display may be preferred, such as, for example, defining a 3D array of ones and zeros to specify which points of the data set are to be respectively rendered as visible or invisible. While this method carries a substantial cost in computational effort, it is highly parallelizable, and for a given array size the cost does not vary with complexity of the allowed subset. For polygonal models it is often faster to restrict rendering to a region included in a convex set defined by clipping planes, of which some fixed maximum number may be supported in an available graphics engine. More complex subsets require other solutions. While the present invention does not specifically address methods of restricting rendering to specified volume subsets, in any given embodiment there may be limitations to certain types of models and volumes for which such restricted rendering is practicable.

A crop box can logically be considered as an element of a rendering decomposition, by specifying a region, i.e., the complement of the box, in which the list of models to be rendered is empty: No part of any model in the model space currently addressed that would appear outside the crop box is to be rendered. This does not preclude the rendering of a stylus, slider objects, elements of additional model spaces or other interactive or semiotic elements of the display scene. Although it is common in software architecture to treat the crop box separately, in the present invention, the general design of a visual display to a user is addressed, rather than its implementation in a particular computing environment. Similarly, although an exemplary embodiment of the crop box is shaped (as the name suggests) in the rapidly-computable form of a rectangular box, it can be spherical, or even have complex arbitrary shapes.

Figure 4:
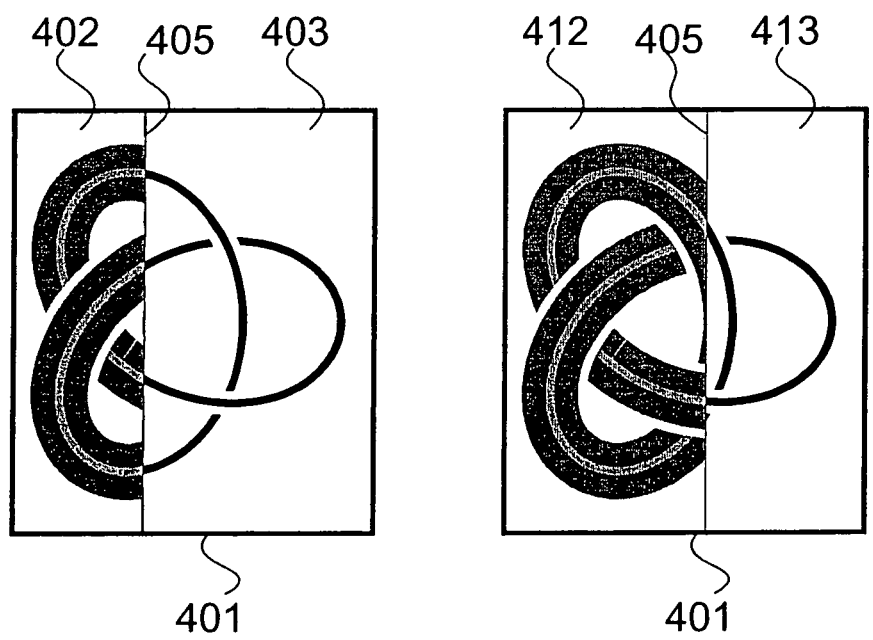
FIG. 4 depicts an exemplary rendering of a model using two different shaders (or two different data sets) where the subdivision of a rectangular region into subregions by a divider is allowed to vary according to an exemplary embodiment of the present invention.

A principal reason for distinguishing a crop box from other rendering volume specifications is that it is often convenient to maintain an invariant relation between the crop box, the model space and the display space while other aspects of the volume decomposition are modified or varied. For example, FIG. 4 shows a rectangular crop box 401 in a fixed relation to a model space containing two subsets 402 and 403, with a different rendering (perhaps of the same model) used in each subset. The two subsets may be changed (keeping the same choices of model and shader) to 412 and 413 without modifying the volume (or area, as the case may be) of their overall union 401.

With reference to FIG. 3, it can be seen that the subregions (i.e., the volume subsets) need not be connected. As is depicted in FIG. 3(a), subdivision 301 comprises two regions, 310 and 311, laid out in a regular checkerboard arrangement. In FIG. 3(a) the two regions are denoted as "X" 311 and "Y" 310 for clarity. Although three 'flavors' of a data set or shader cannot be placed so evenly in rectangular regions, the segmenting of subdivision 351 into regions 360 (labeled as "A"), 361 (labeled as "B") and 362 (labeled as "C") is an example layout both regular and convenient for most such cases. Numerous such alternative geometric subdivisions may be created within the scope of the present invention.

Although in an exemplary embodiment it is possible to keep the rendering decomposition entirely under system control, where a system designer desires to precisely direct what will be seen by a user and with what shader, in a preferred exemplary embodiment of the invention the rendering decomposition is under the control of a user. In that context, two forms of control are relevant.

One exemplary form of user control for a rendering decomposition is the ability to move it, as the subset separator 405 moves in FIG. 4. If, as in FIG. 5, the movement of a region-separating plane 501 is also enabled to include rotation, such that it can assume orientations which are not parallel to a crop box boundary plane, it may separate a crop box 500 into regions 510 and 511 of more complex shape. In general, if E is a rigid transformation (e.g., for example, a rotation, translation or some combination of these operations) of a model space, under a rendering decomposition moved by E, the assignment of a subset and its associated shader or shaders to a point with model space coordinates (u, v, w) is defined to be the assignment that the original rendering decomposition would give to the point with model space coordinates $E^{-1}(u, v, w)$, where $E^{-1}$ is the inverse matrix of E. (This point is thus the unique point (u', v', w') such that E(u', v', w')=(u, v, w).) If E is any invertible transformation, such as scaling, shear or non-linear warping, the same definition provides a way of moving any rendering decomposition provided only that the environment provides a way of specifying E.

Most 3D interaction environments provide at least a way of specifying E as an arbitrary rigid transformation, so that the corresponding movement of any rendering decomposition is controllable. Among other possible transformations, control of scale ('zoom') is common, control of shear transformations is rarer, and control of non-linear warping is generally associated with specialist applications. In a preferred exemplary embodiment the Euclidean motion of a hand-held sensor is sensed, this motion is expressed in display coordinates and as E in the currently corresponding model space coordinates, and E is used as the transformation moving the current rendering decomposition.

Modification by motion is thus uniformly possible for any rendering decomposition. In a particular application, it may be convenient to restrict the range of motion available to a user. For example, FIG. 2 shows a rectangular crop box, which may be divided in three ways. A given division would be selected, for example, by pressing a button by a voice command, by a click on a menu option, or by other means as may be known in the art. A rectangular crop box 201 with internal coordinates (p, q, r) measured along its edges is divided by a (p, q)-plane 211, a (p, r)-plane 221 or a (q, r)-plane 231 into regions 212 and 213, regions 222 and 223 or regions 232 and 233, respectively. These regions define the display subsets of the rendering decomposition, and shader-defining interactive objects for each are either preset or made available to a user to determine which model or models are to appear in each subset and the way they are to be respectively rendered. The range of motion is purely translational, with each plane allowed to move only in the axis direction which is normal to it. A user may control this motion by a slider, a wheel mounted on a mouse, or using any one-variable continuous input device as may be known in the art. Alternatively, a user equipped with a sensor whose position in three-dimensional space is known to the system may use such a device to drag a slider, or to touch and drag the plane in the desired direction. Activation of the dragging mode may be made, for example, by voice, by placing the tip of a rendered stylus sufficiently close to the visible edge of the cutting plane and moving with a device button held down (whereupon the plane moves to continue passing through the stylus tip position, irrespective of any motion in directions parallel to the plane), or by any other means as may be known in the art.

Figure 6:
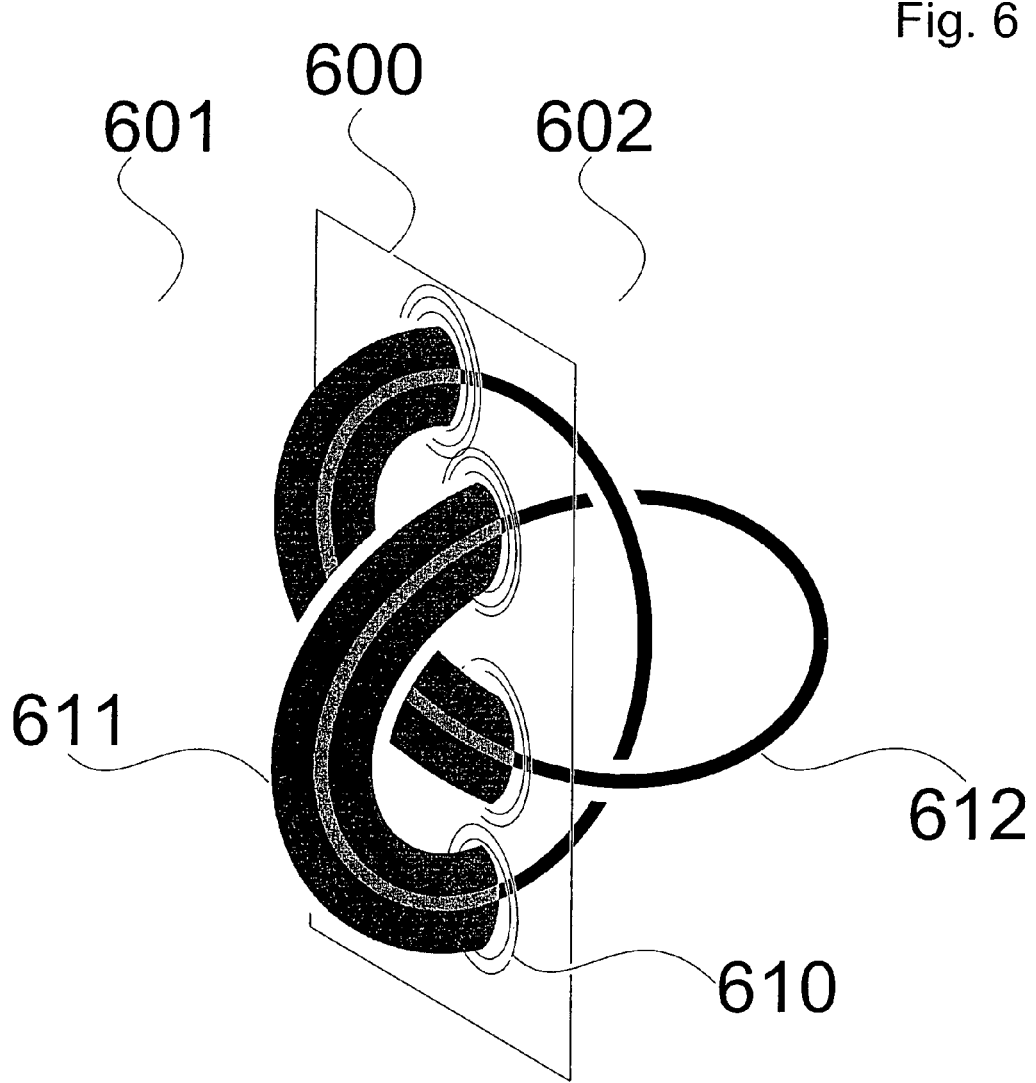
FIG. 6 shows an exemplary subdivision into two 3D subregions and one two-dimensional subregion, each rendered according to its own shader or using its own data set according to an exemplary embodiment of the present invention.

In other exemplary embodiments of the invention, regions of the subdivision may be two-dimensional sets (surfaces), one-dimensional sets (curves), or 0-dimensional sets (points). FIG. 6 illustrates these possibilities for the case of two subregions 601 and 602 respectively possessing volume, separated by a planar subregion 600 possessing only area. Distinct shaders or data sets used in the three subregions produce distinct renderings 611 for subset 601, 612 for subset 602 and 610 for subset 600, respectively. In an alternative exemplary embodiment of the present invention a single planar region can be contained in a single volumetric region (rather than separating it into two as in the example depicted in FIG. 6), or one, two or three planes parallel to the sides of the crop box. More generally, in exemplary embodiments a two-dimensional subregion may within the scope of the present invention have, for example a curved form, such as a spherical or other analytically defined surface f(x, y, z)=0 or a polygonal surface constructed a priori or extracted from the data. To illustrate an example of such surface extraction, if a scanning modality is tuned to respond to gene activation in cells of the membrane surrounding the brain, it may nevertheless acquire non-zero data values from points (x, y, z) that are not on the brain surface. Extracting the surface geometry from this or another scan, and displaying the gene activation data only on the extracted surface, would make the surface activation values more apparent to a user.

Figure 5:
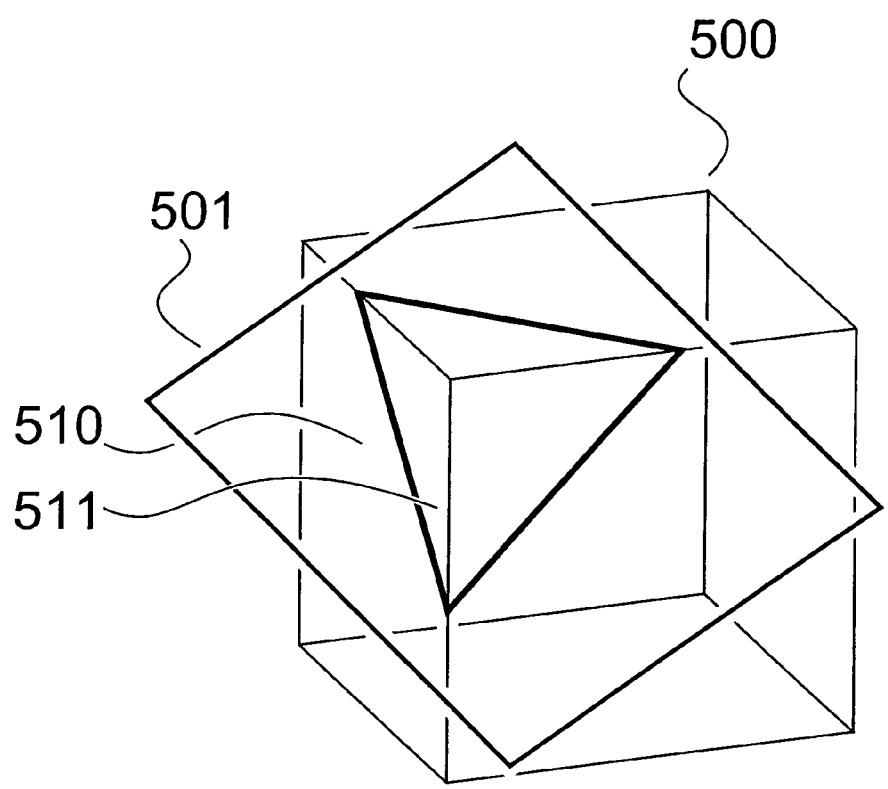
FIG. 5 illustrates an exemplary subdivision of a rectangular region using a dividing plane that is not parallel to the sides of the region according to an exemplary embodiment of the present invention.

FIG. 5 depicts an exemplary embodiment where a single plane 501 is used to separate an exemplary crop box 500 into two regions 510 and 511, defining the display subsets of the rendering decomposition. Plane 501 is free to move in three dimensions, and in preferred exemplary embodiments it may be controlled via, for example, a hand-held sensor in three dimensions which reports both position and orientation, so that the plane 501 can move with a user's hand. Other input devices may be used, such as, for example, a track ball or a mouse, which may be switched, for example, between a 'control angle' mode and a 'translate in (x, y) directions' mode, or alternatively, to control various other decompositions descriptive of planar motion which may be known in the art.

In general, it is fully within the scope of the present invention to apply any means of positioning control of a three-dimensional object in a computer display to the specific task of defining a rigid motion E of a rendering decomposition relative to a model space. As is evident from the foregoing complex rendering decompositions would require more than a standard form, such as a plane, and position variables to specify them. For example, the exemplary subdivisions depicted in FIG. 3, which divide the example model space into two display subsets 310 and 311, and three display subsets 360, 361 and 362, respectively, may be modified by scaling in various directions, or in all directions simultaneously by the same factor. Similar scale controls in all or some directions may be applied, for example, to a three-dimensional hexagonal subdivision where the cell layers meet in a shape akin to that used by bees in a honeycomb, etc. Other controls could vary corner angles within the rectangular or hexagonal blocks in the example subdivisions illustrated, or utilize other geometric factors in the construction of these or other subdivisions. The designer of an exemplary embodiment may make any such factors separately controllable by a user, by, for example, the use of sliders, step controls where a user may, for example, click or issue a voice command to increase or decrease by a standard amount, or other size control means as may be known in the art.

Figure 7:
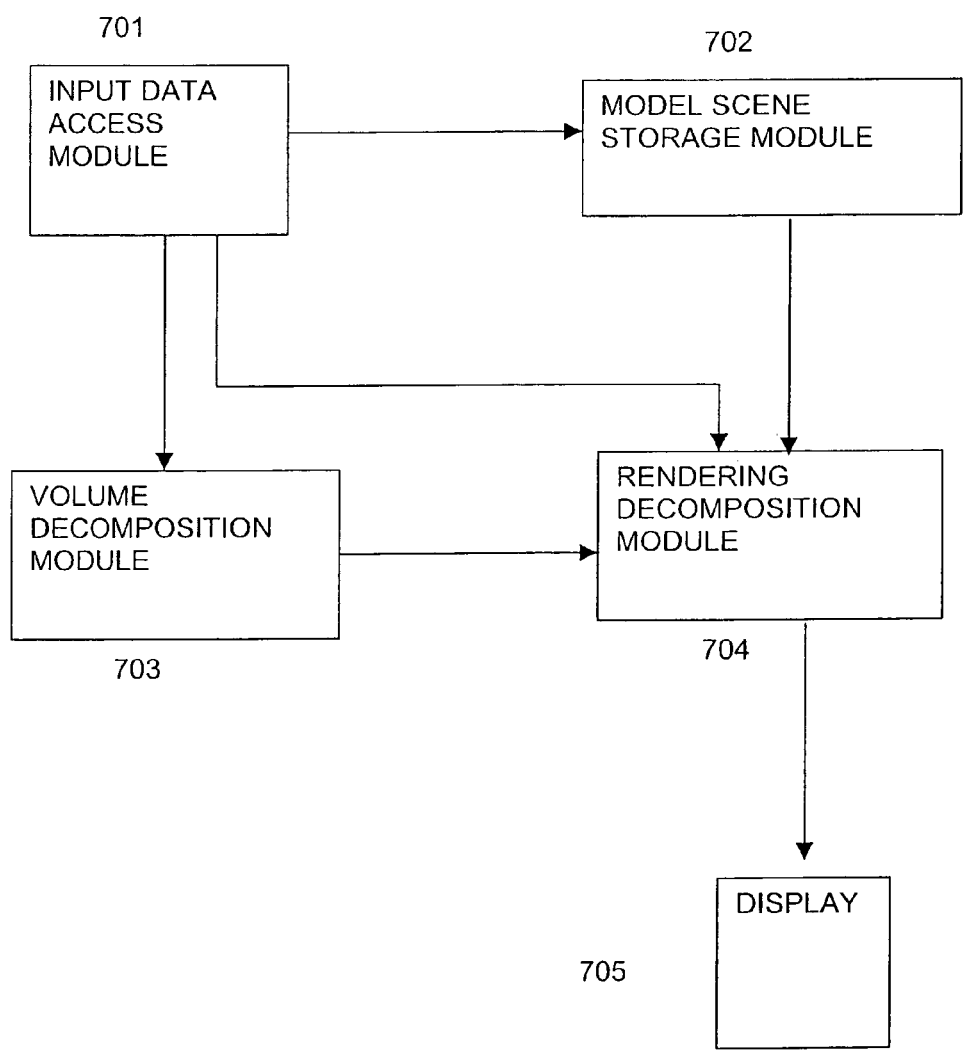
FIG. 7 is an exemplary modular software diagram according to an exemplary embodiment of the present invention.

FIG. 7 depicts an exemplary modular software program of instructions which may be executed by an appropriate data processor, as is known in the art, to implement a preferred exemplary embodiment of the present invention. The exemplary software program may be stored, for example, on a hard drive, flash memory, memory stick, optical storage medium, or other data storage devices as are known or may be known in the art. When the program is accessed by the CPU of an appropriate data processor and run, it performs, according to a preferred exemplary embodiment of the present invention, a method for controlling the scaling of a 3D computer model in a 3D display system. The exemplary software program has four modules, corresponding to four functionalities associated with a preferred exemplary embodiment of the present invention.

The first module is, for example, an Input Data Access Module 701, which can accept user inputs, such as, for example, 3D data sets, volume decompositions, rendering rules, modifications to boundaries between adjacent subsets, etc., all as described above, via any user interface as may be known in the art. A second module is, for example, a Model Scene Storage Module 702, which stores the 3D data or models currently available for rendering in the display system.

A third module is, for example, the Volume Decomposition Module 703, which receives inputs from the Input Data Access Module 701 regarding how a given crop box is to be subdivided, as well as definitions, settings and modifications as to boundary regions or surfaces separating adjacent subsets of the display region. A fourth module is, for example, a Rendering Decomposition Module 704, which takes data inputs from, for example, the three other modules 701, 702, and 703, and renders the various model(s) in the display region according to the then applicable rules within each subset. This rendering decomposition is ultimately used to drive the 3D display 705 and present the information to a user/viewer.

Figure 8:
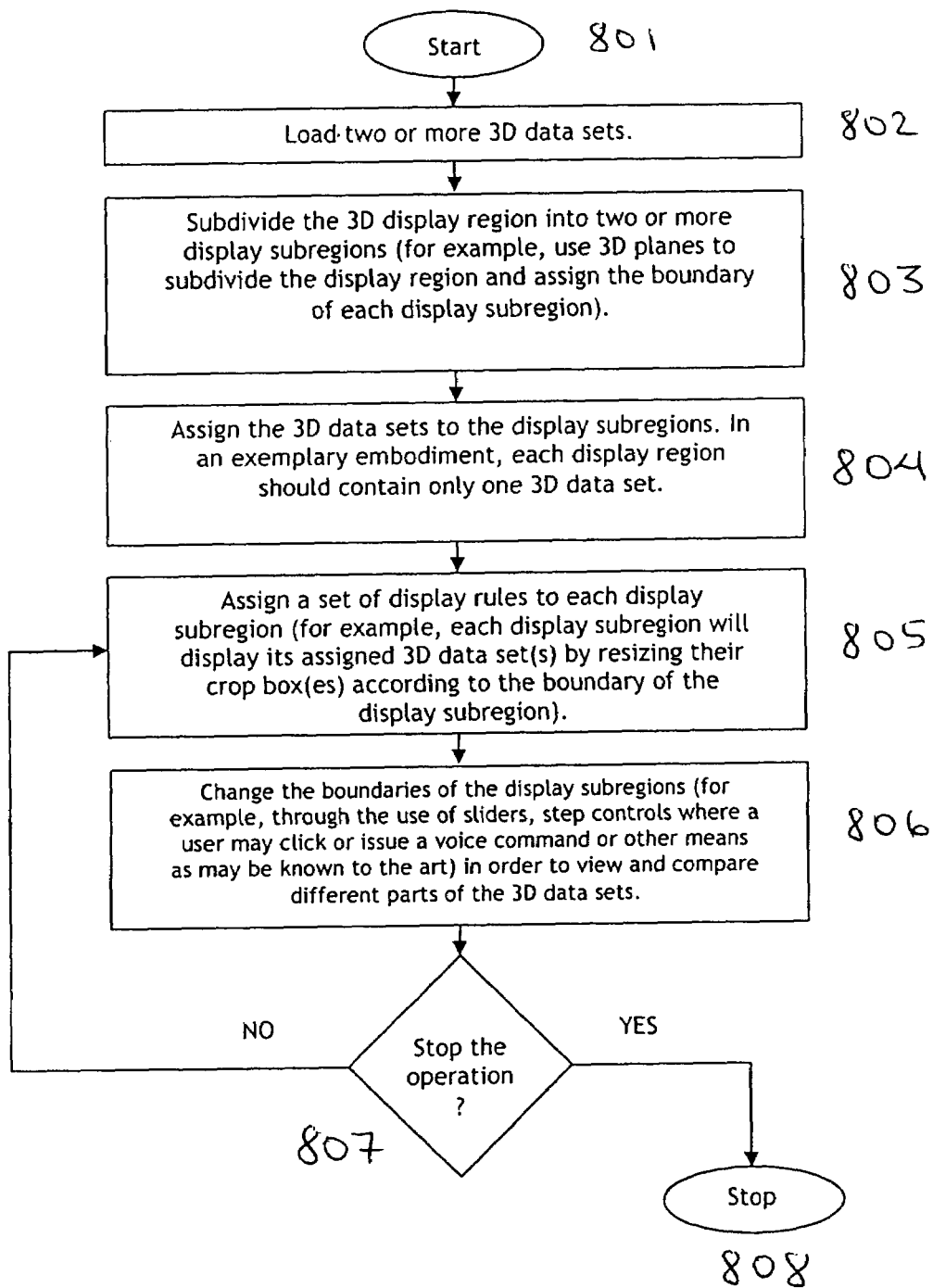
FIG. 8 depicts an exemplary process flow diagram for an exemplary embodiment of the present invention.

FIG. 8 depicts an exemplary process flow diagram for an exemplary embodiment of the present invention, where a 3D display region is divided into display subregions that contain one or more three dimensional data sets. Beginning at Start 801 the process flow moves to 802 where the system is loaded with two or more 3D data sets. At 803 the 3D display region is subdivided into two or more display subregions, such as, for example, by using 3D planes to subdivide the display region and assign the boundary of each display subregion. At 804 the loaded 3D data sets are assigned to the display subregions. In an exemplary embodiment, only one 3D data set will be displayed in a given subregion. At 805 a set of display rules is assigned to each display subregion. For example, each display subregion will display its assigned data set by resizing its crop box according to the boundary of the display subregion. At 806, by means of a user, or predetermined rules, or any combination of the two, the boundaries of the display subregions are changed, by means of some interactive object or device, so that a user can view and compare different parts of the 3D data sets. Finally at 807, the system queries whether the operation should be stopped. If yes, at 808 process flow stops. If no, flow returns to 805, and the subregion display rules, as well as the subregion boundaries and the 3D data sets assigned to the subregions may be changed.

Example Implementation

In an exemplary embodiment of the present invention, an exemplary method of the present invention can be applied to the comparison of a registration between the CT and MRI scan data of a given patient. CT is used to see the bone, and MRI to see the soft tissue (e.g., brain cortex and tumor), to enable careful planning before surgery. The user can, for example, first perform a registration between the two data sets. Once registered, a user can, for example, visually inspect the result to see how good the implemented registration in fact was. Utilizing the functionalities of the present invention, a user can apply different display rules to different regions of a display, and thereby view one type of scan data in one region and another in the other region. By moving the border between subregions a user can gain a complete understanding of the information available from scanning an object.

Figure 9:
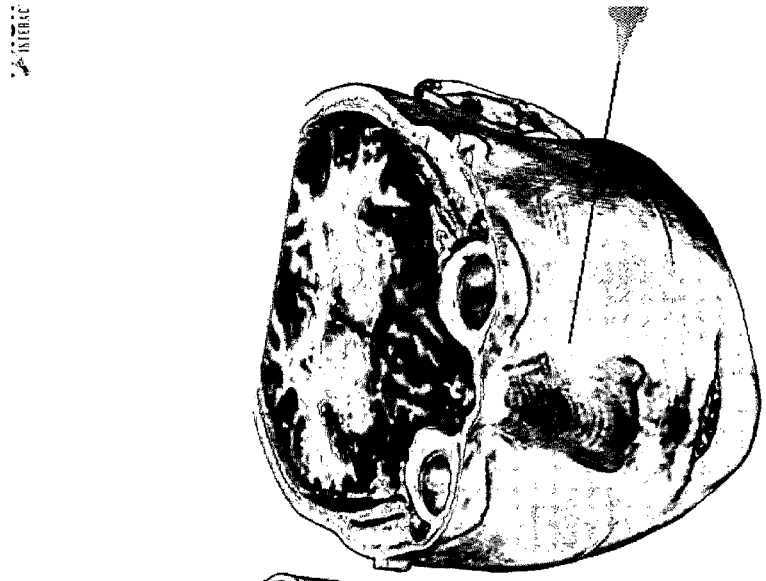
FIGS. 9-28 depict an exemplary application of a method according to an exemplary embodiment of the present invention to a registration comparison. Many exemplary aspects of the present invention are illustrated therein.
Figure 9:
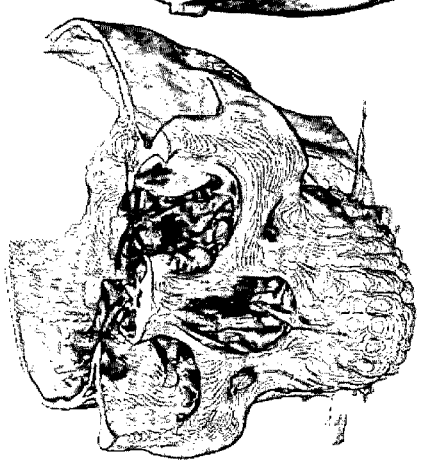
Figure 10:
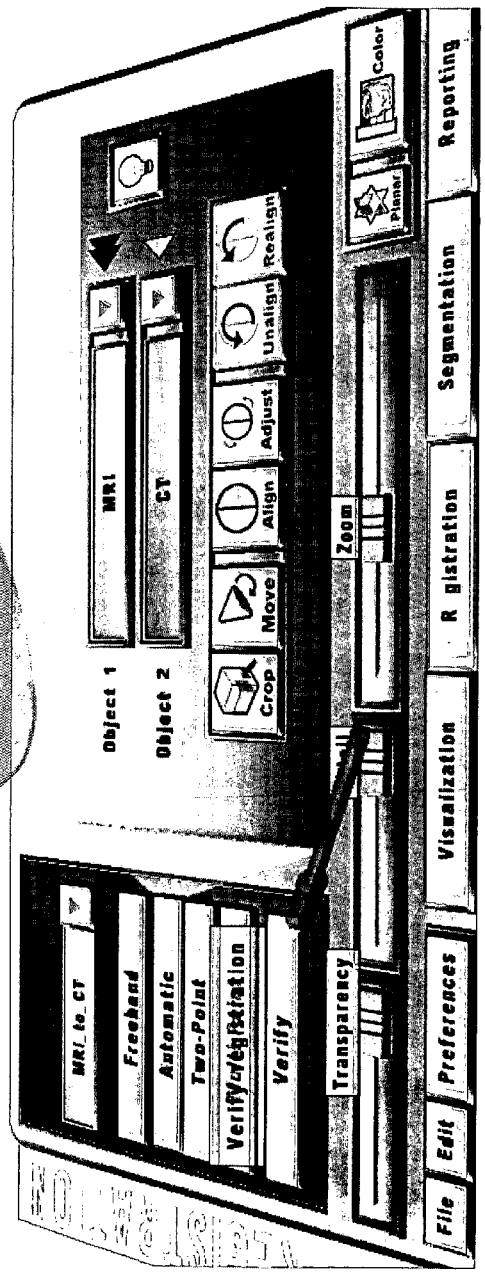

FIG. 9 depicts CT (left side of figure) scan data showing the bone, as well as MRI (right side of figure) scan data showing the skin and brain tissue of the same patient, separately. FIG. 10 depicts these two data sets after co-registration (the actual registration is not shown here, but "registration" tab is visible in virtual control palette at bottom center), where a user can select the "Verify" module to compare the two data sets and their registration.

Figure 11:
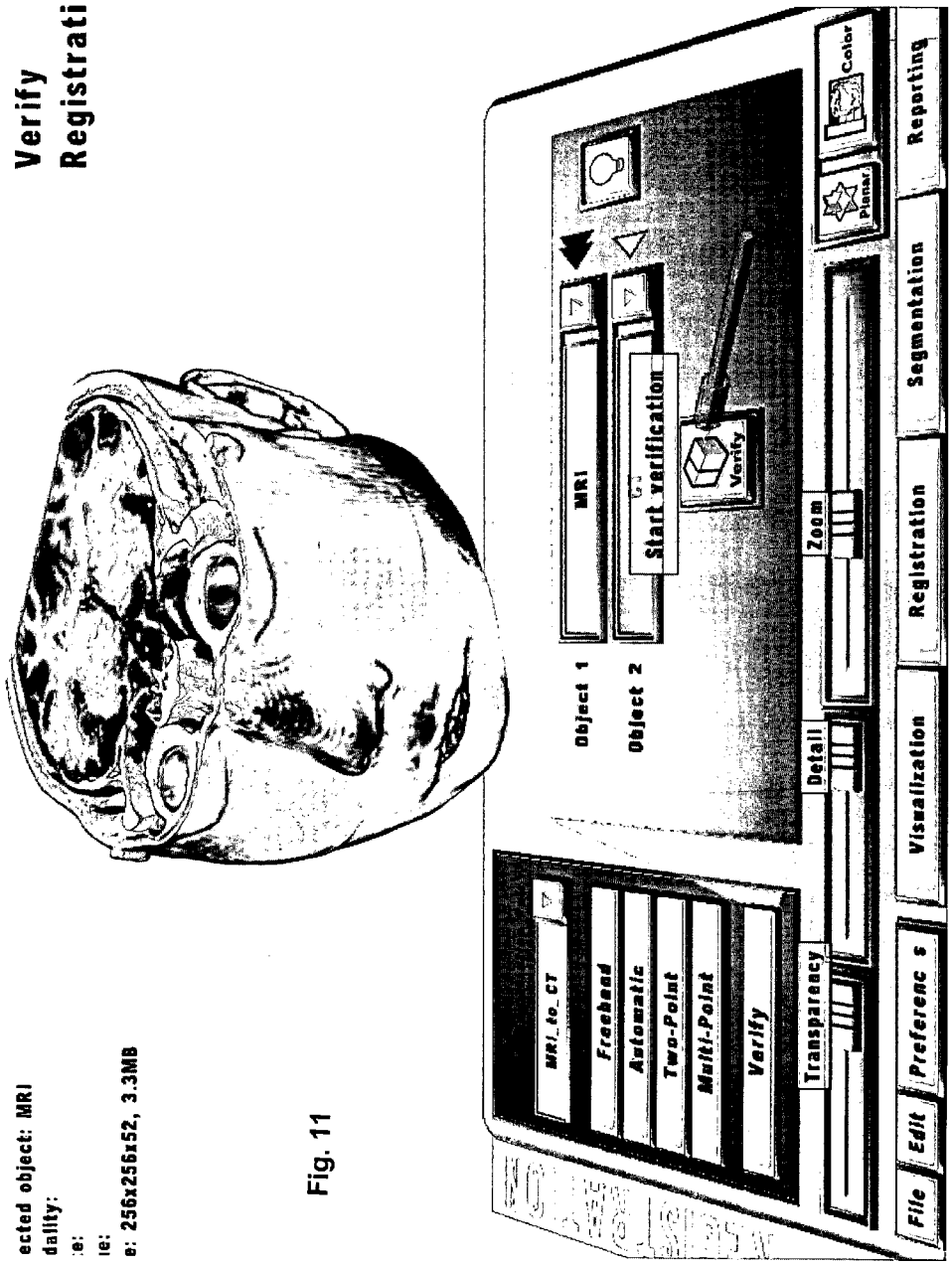
Figure 12:

With reference to FIG. 11, a user selects MRI as "Object 1" in the virtual control palette and CT as "Object 2" in the virtual control palette, and can then press a "Verify" button to start comparing the data sets. FIG. 12 depicts the two data sets in one crop box, which can be now manipulated as a single object, but with a separating horizontal plane in between the two sets. In the depicted example screen shot, the horizontal plane is The system allows several ways of display (see control panel); Cut (vertical), Cut (horizontal) and Swap. At the depicted point in the process the user can now start interacting with the data sets.

Horizontal Separating Plane

Figure 13:
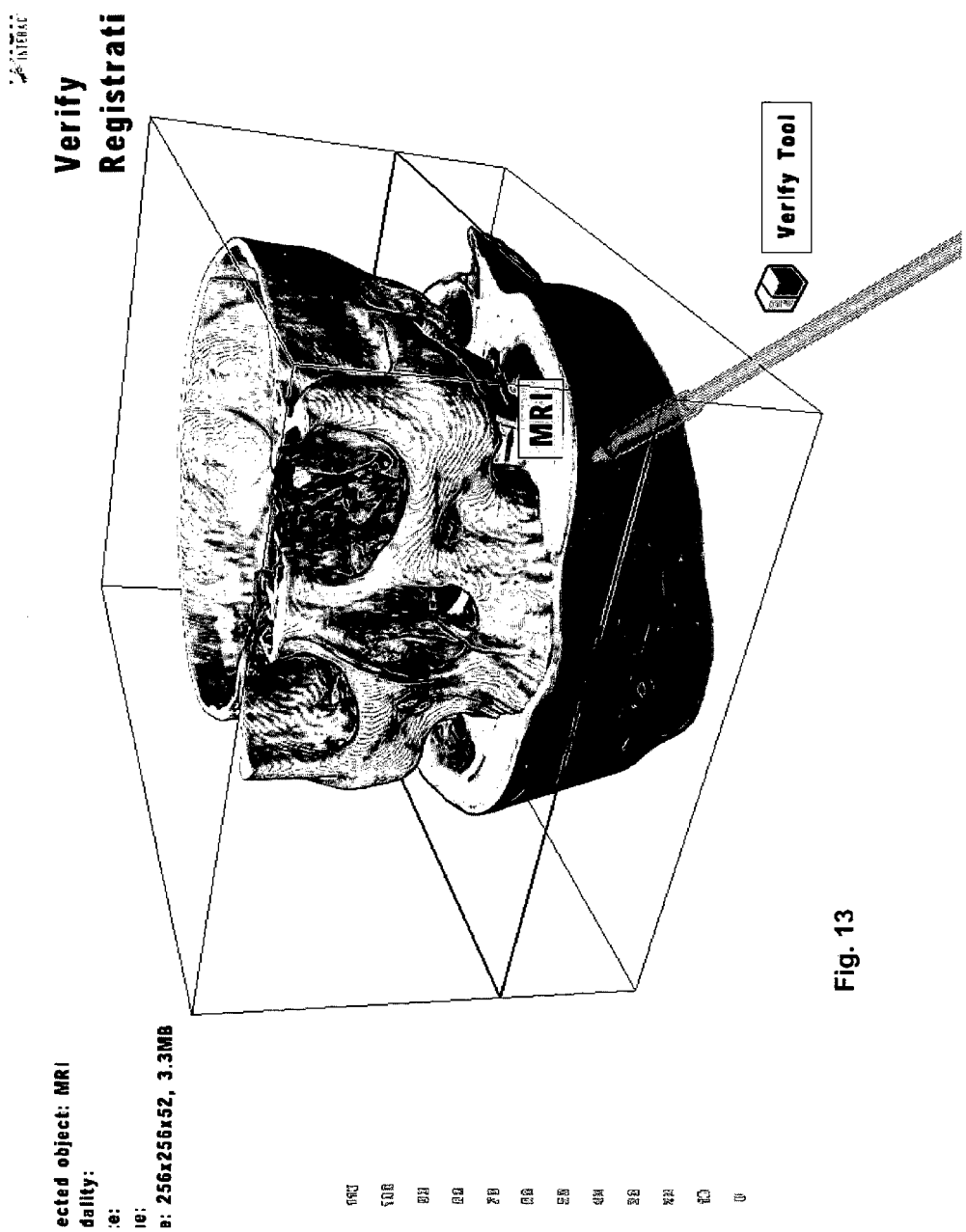
Figure 14:
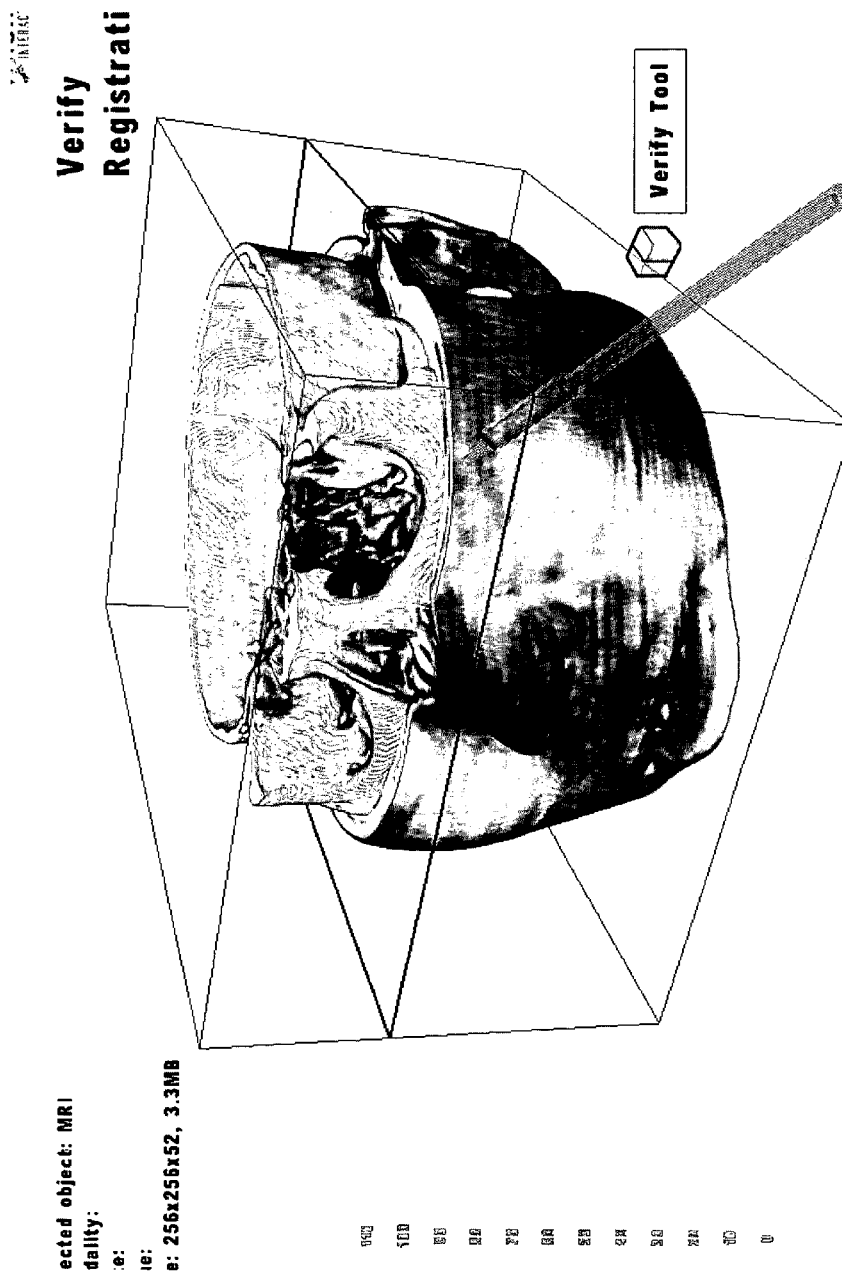

FIG. 13 depicts the user moving the horizontal separating plane between the top (CT) and bottom (MRI) subregions. FIG. 14 depicts the user moving the separating plane between the top (CT) and bottom (MRI) halves, setting the horizontal dividing plane somewhat higher.

Vertical Separating Plane—Left/Right

Figure 15:
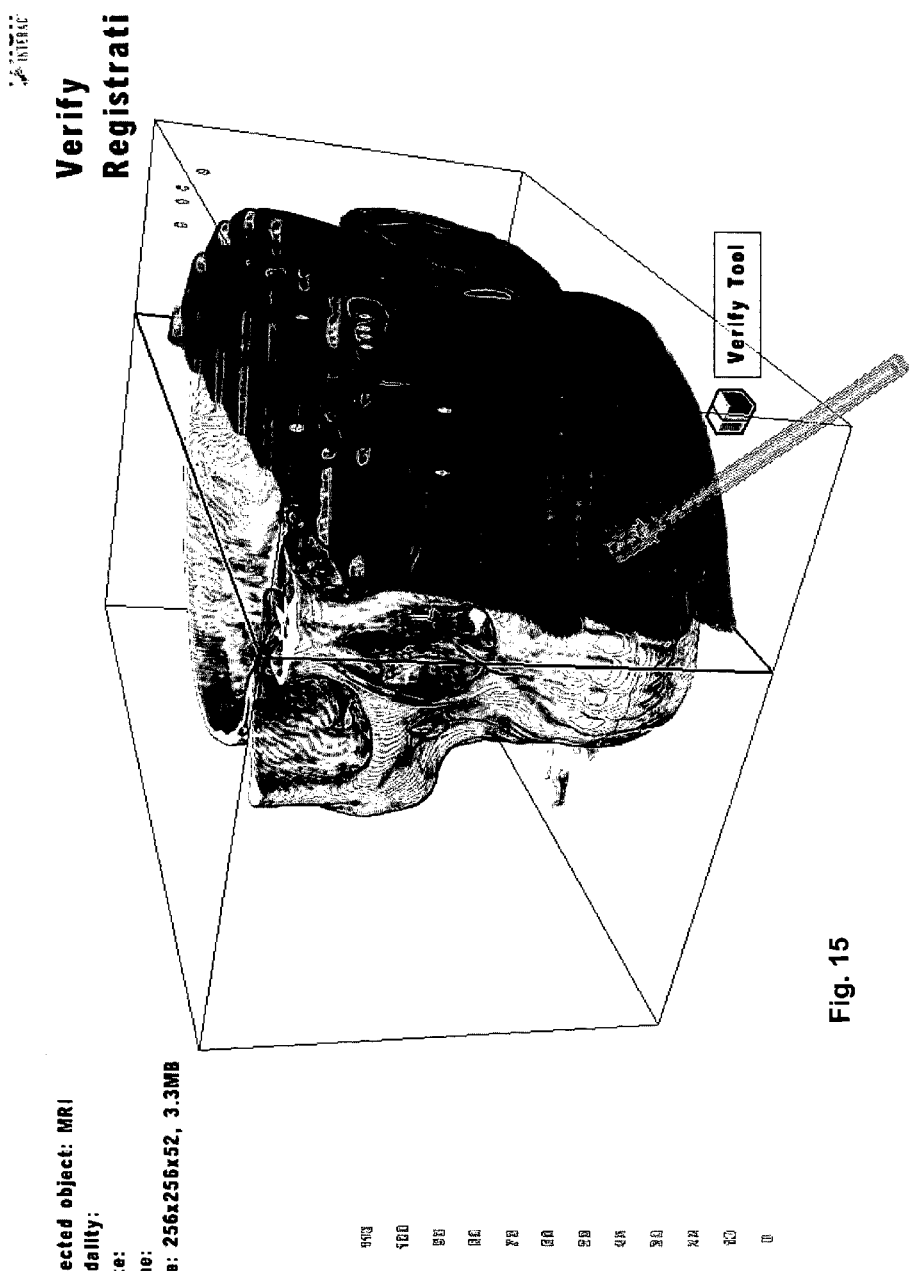
Figure 16:
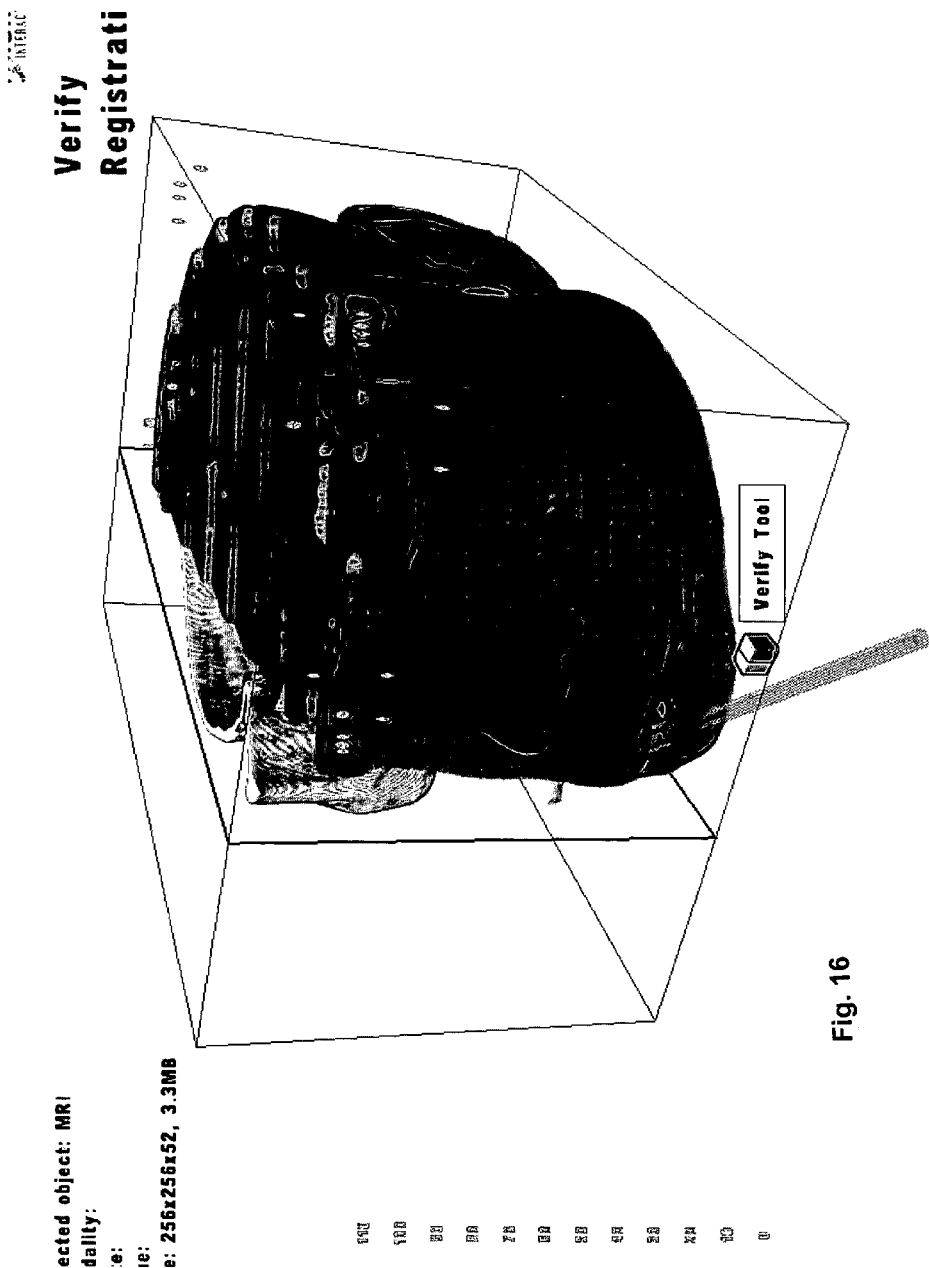
Figure 17:
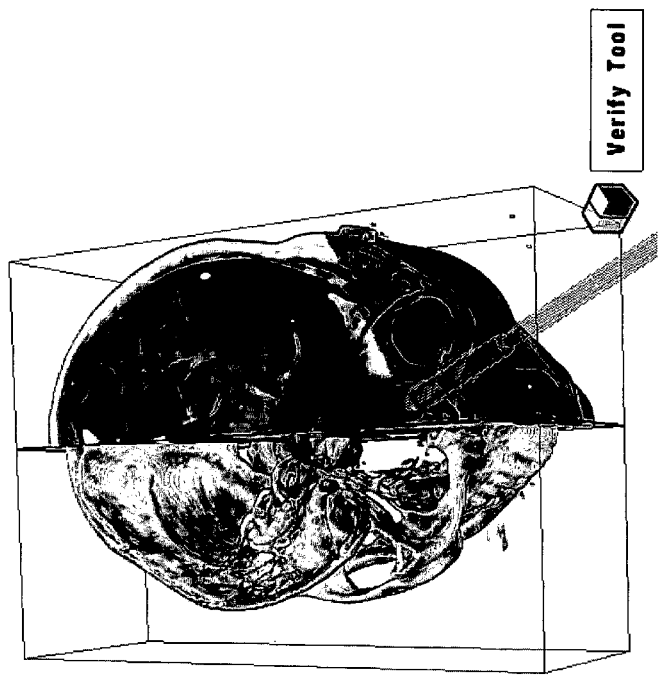

FIG. 15 depicts a user now moving a vertical separating plane between the left (CT) and right (MRI) halves. FIG. 16 depicts a user moving the vertical separating plane between the left (CT) and right (MRI) halves, with most of the face displaying the MRI data set. FIG. 17 depicts a top view of a user moving the separating plane between the left (CT) and right (MRI) halves. The separating plane is perpendicular to the object's face, and thus divides the head into left and right sections.

Figure 18:
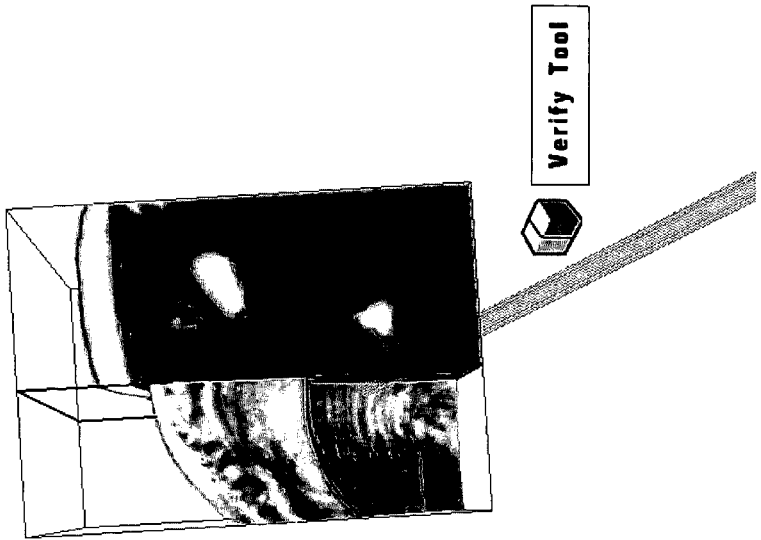
Figure 19:
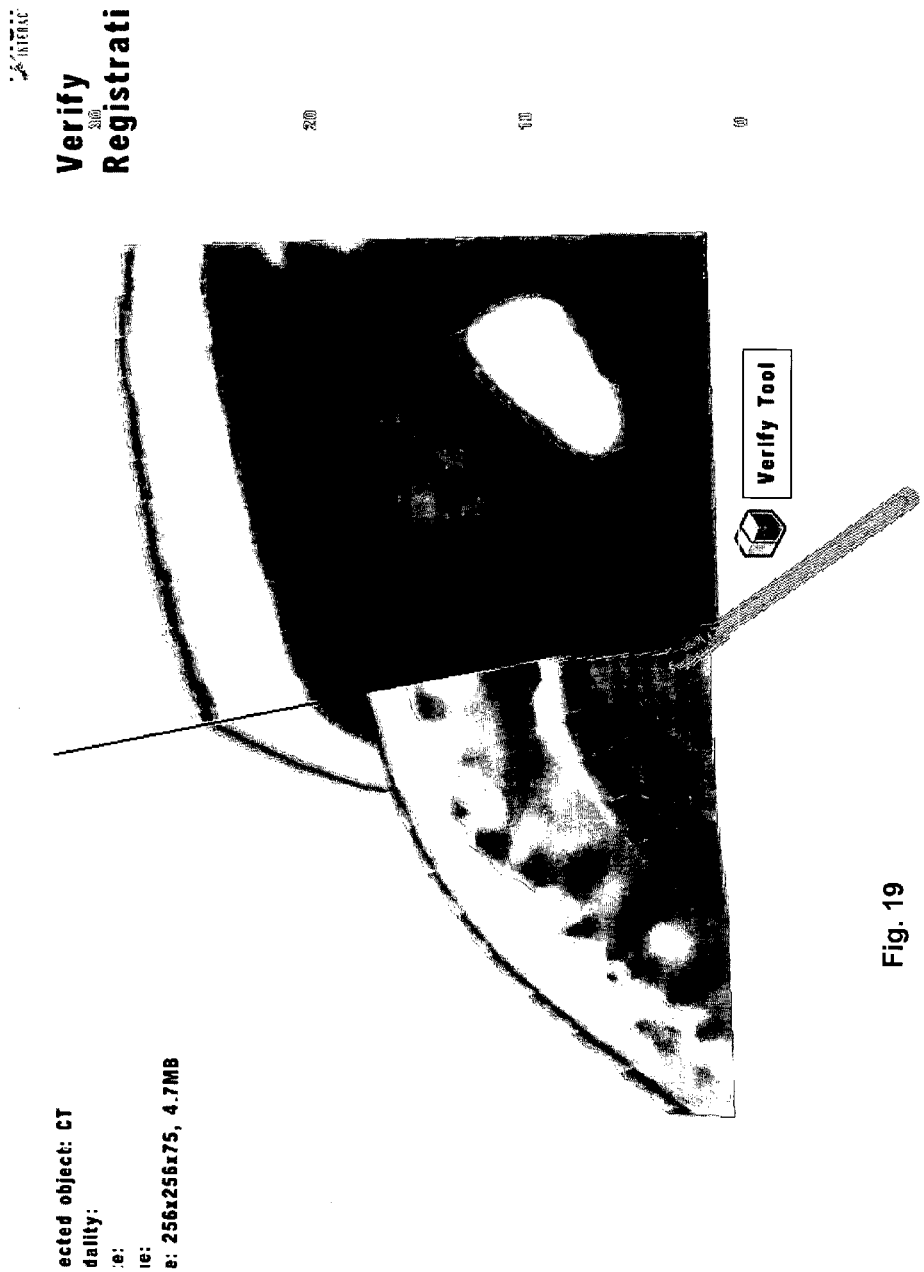
Figure 20:
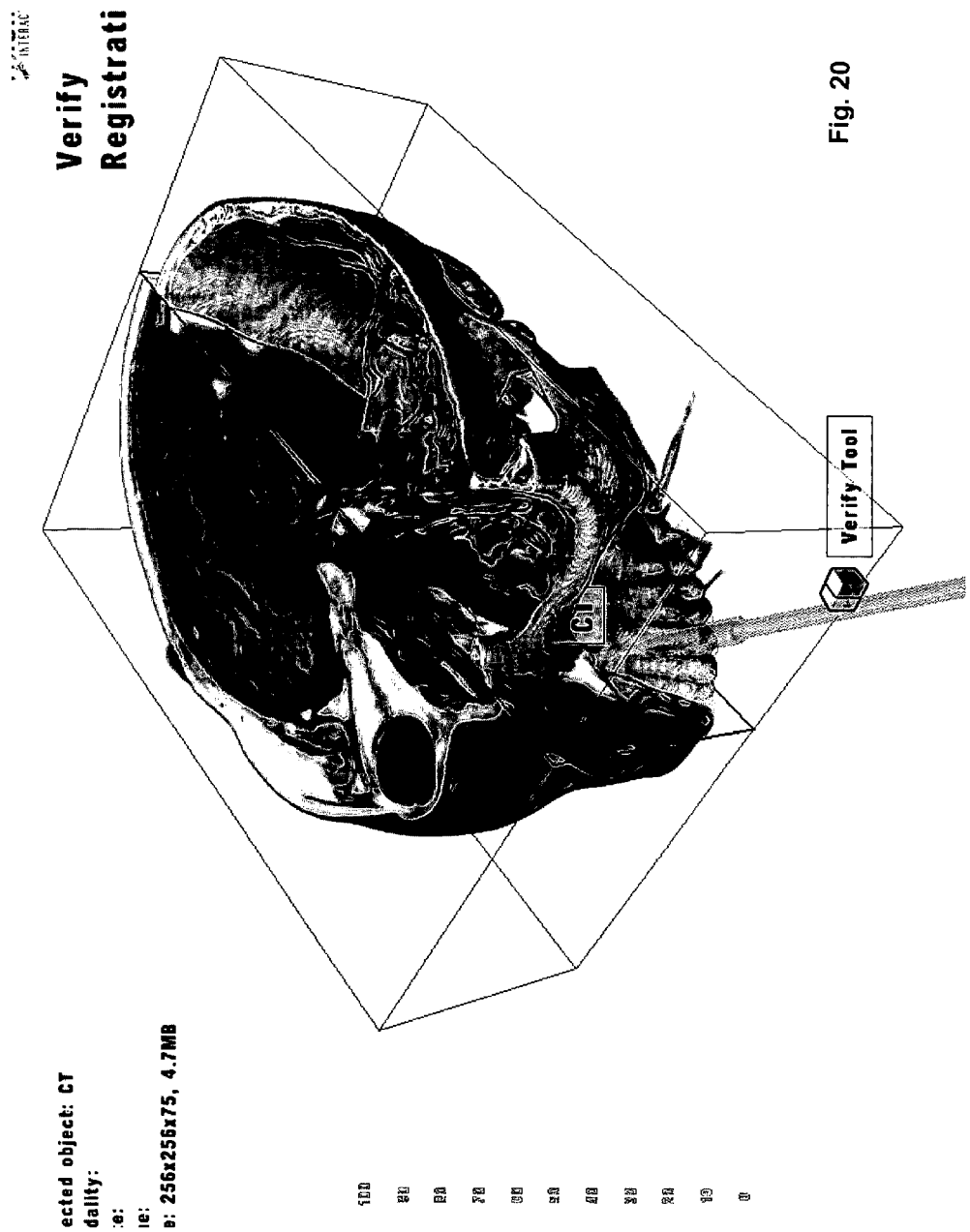

With reference to FIG. 18, a magnified view of the top of the back of the skull from FIG. 17, a user moves a vertical separating plane between the left (CT) and right (MRI) halves. As shown here, a user can, for example, magnify the box to have a detailed view of the match between the two objects. Utilizing even more magnification, FIG. 19 depicts the user moving the separating plane between the left (CT) and right (MRI) halves in a detailed view of the match between the two objects. FIG. 20, now returning to nonmagnified mode, depicts the user moving the separating plane between the left (MRI) and right (CT) halves, using a different perspective angle relative to FIG. 17. It is noted that the MRI and CT data sets have swapped left and right positions relative to FIGS. 15-19.

Vertical Separating Plane—Front/Back

Figure 21:
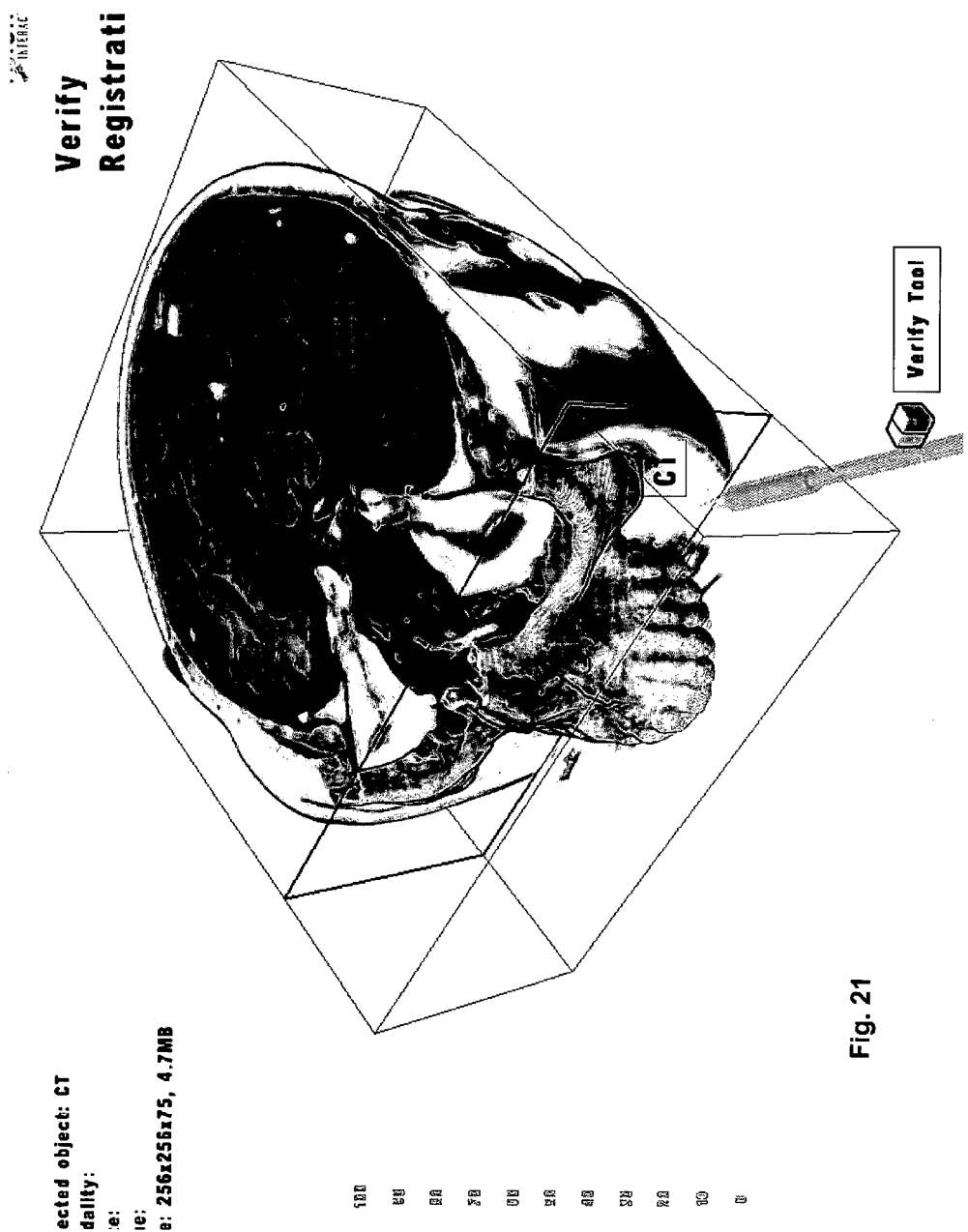
Figure 22:
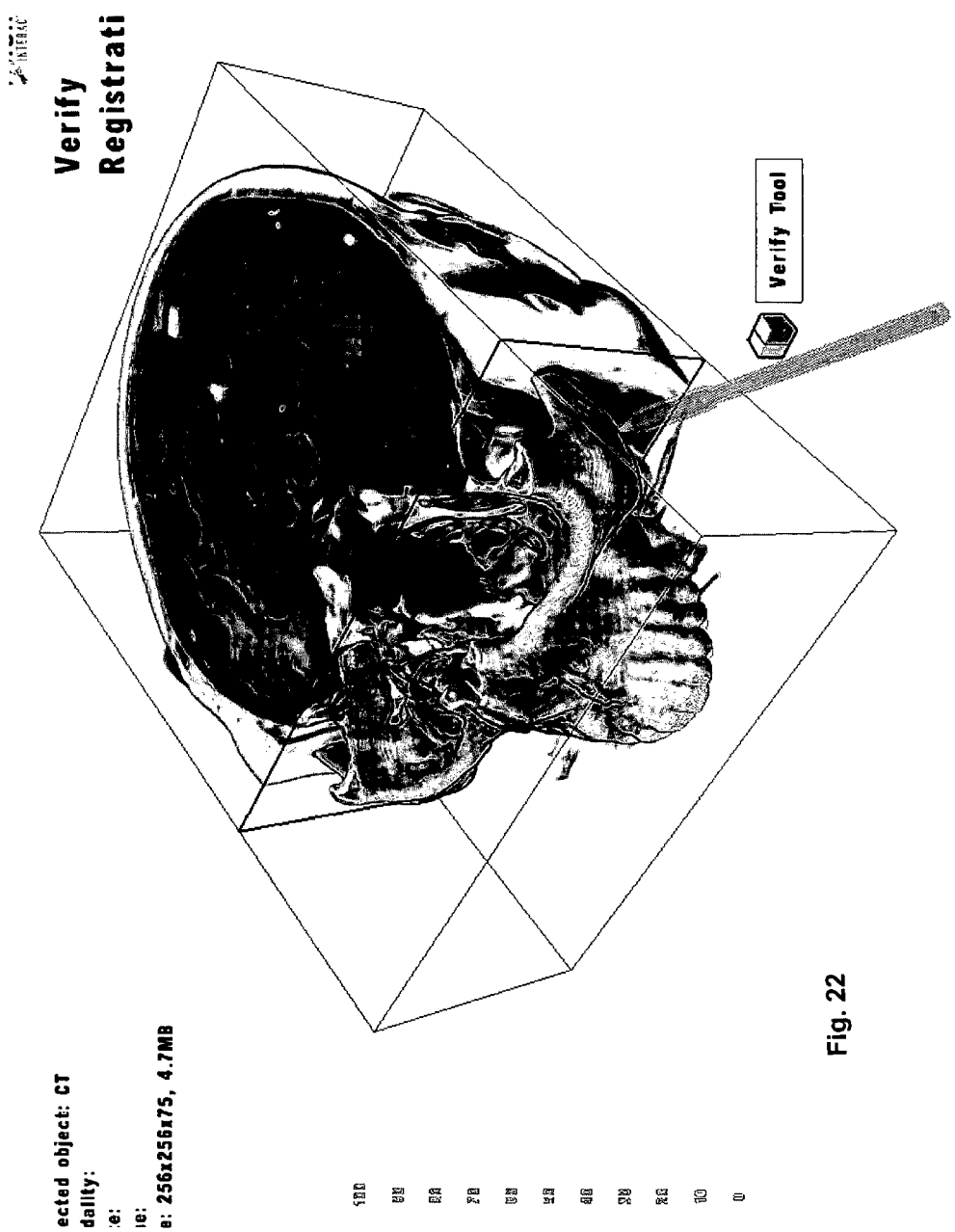
Figure 23:
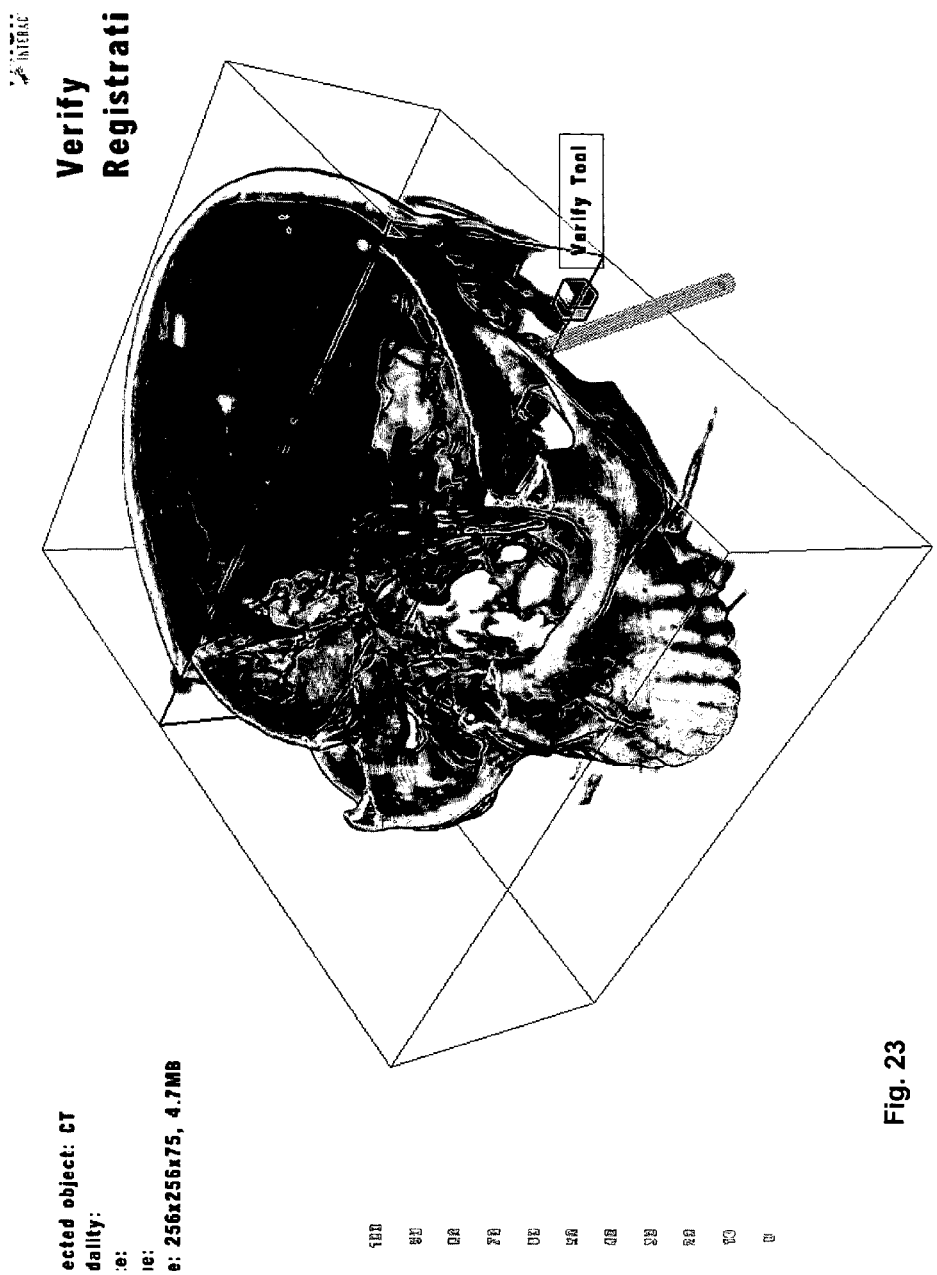

FIG. 21 depicts the user moving the separating plane between the back (MRI) and front (CT) halves. The separating plane is parallel to the object's face, and thus divides the head into front and back sections. FIG. 22 depicts the user moving the separating plane between the back (MRI) and front (CT) halves, where the separating plane has been moved rearward somewhat. FIG. 23 depicts the user moving the separating plane between the back (MRI) and front (CT) halves, where the separating plane has been moved still rearward somewhat.

Figure 24:
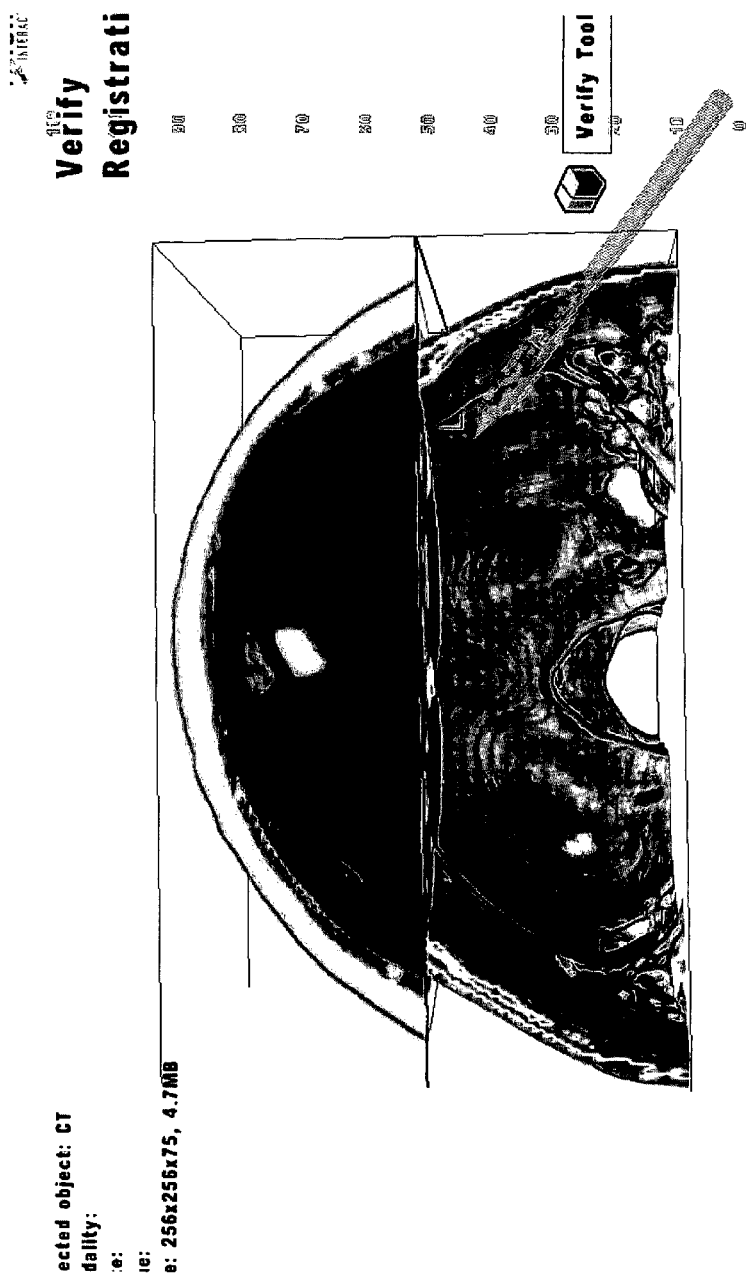
Figure 25:
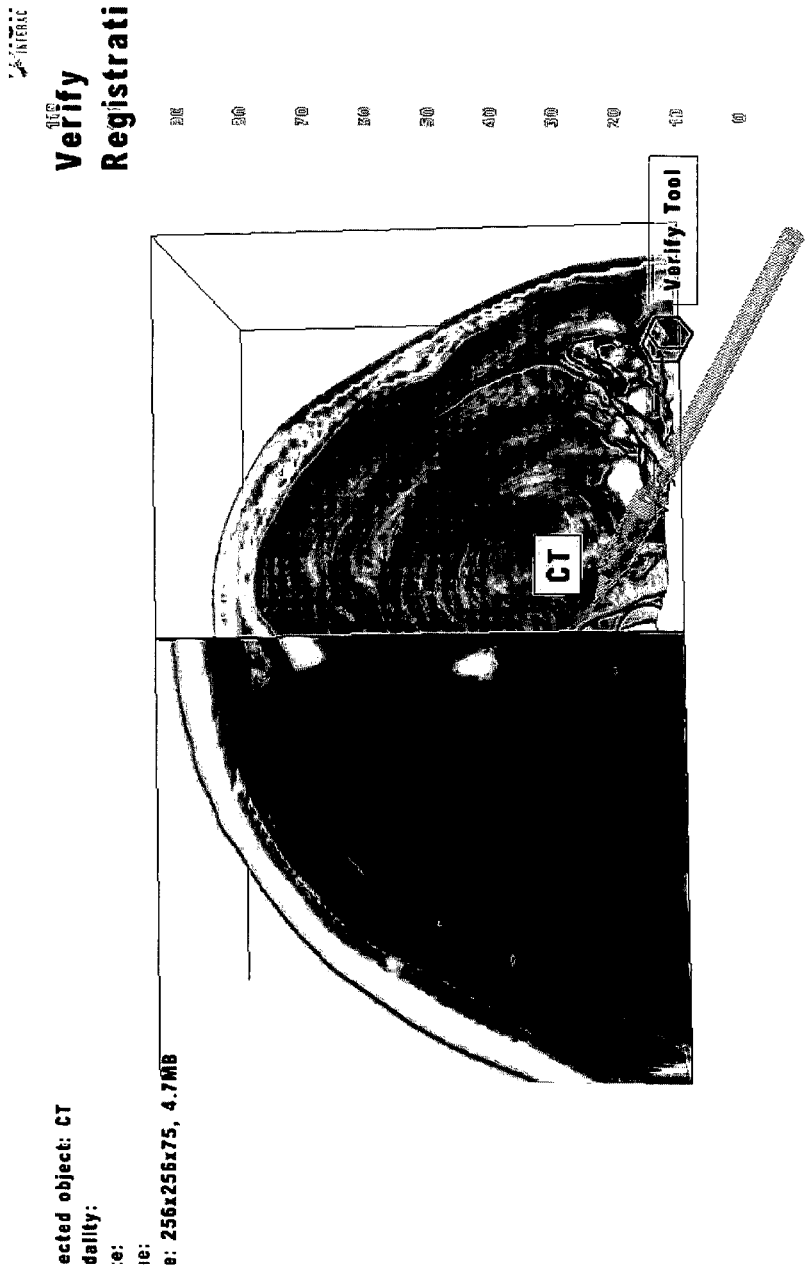
Figure 26:
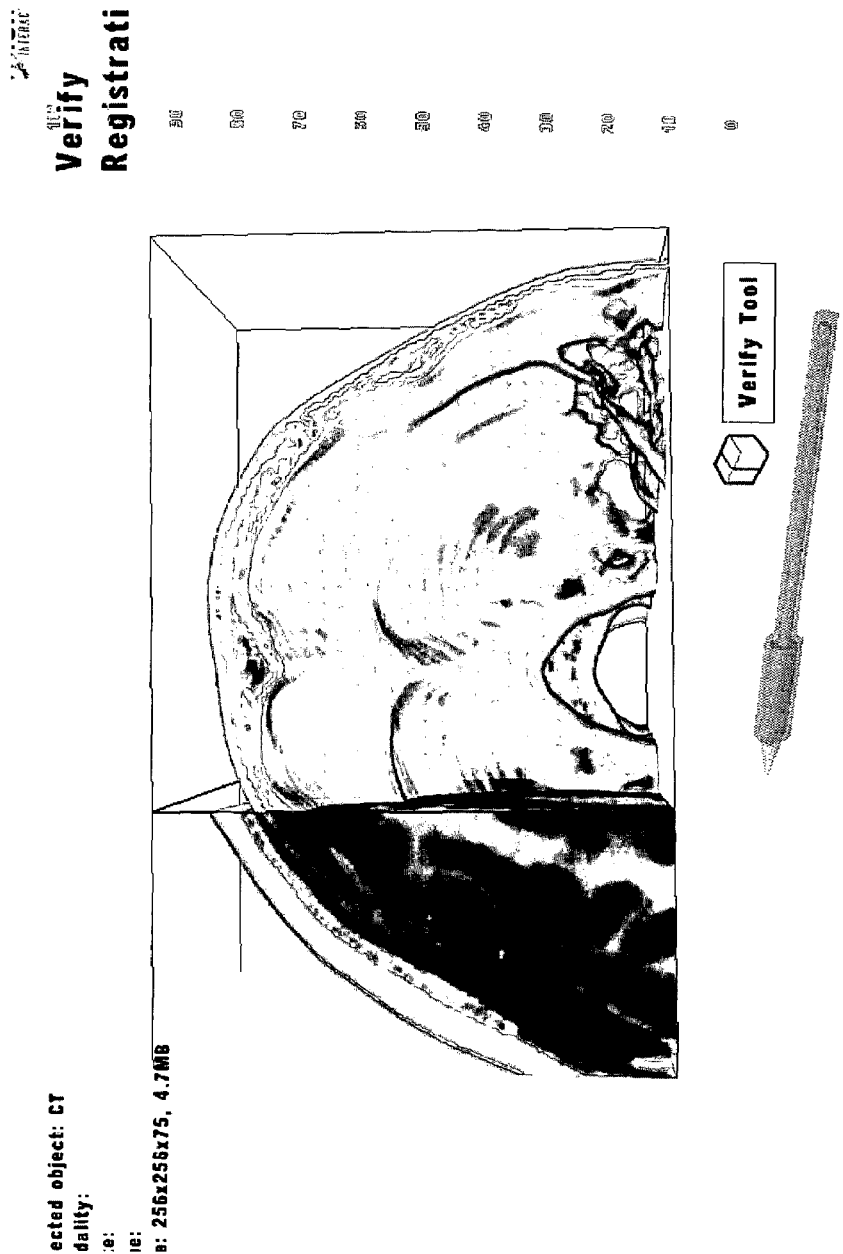
Figure 27:
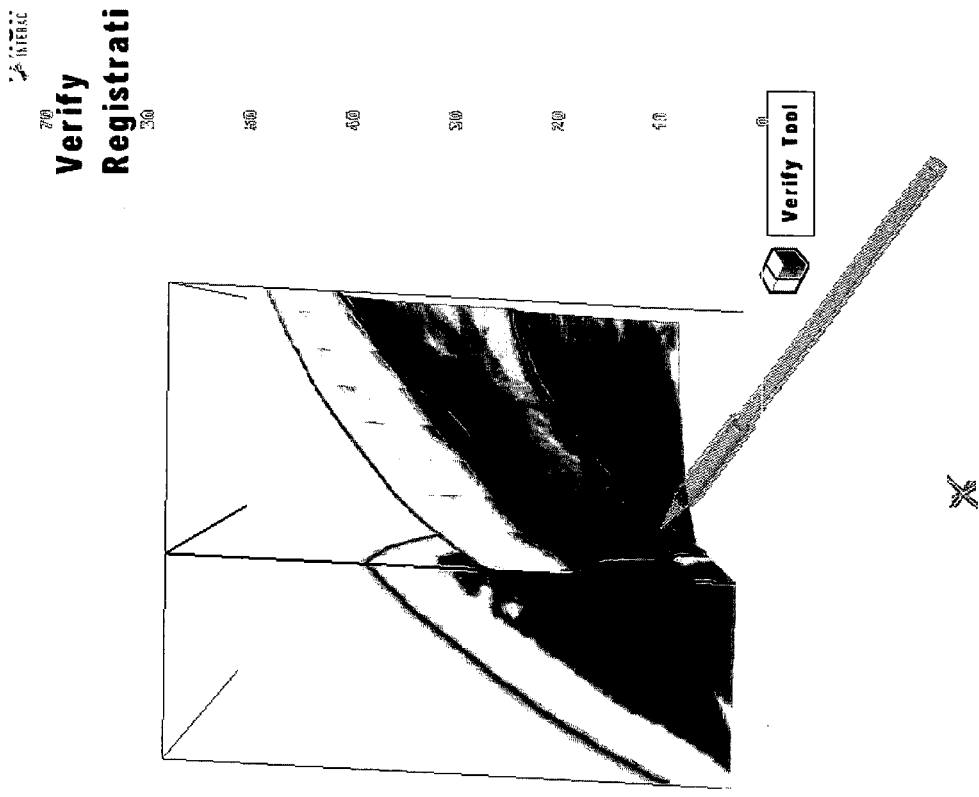
Figure 28:
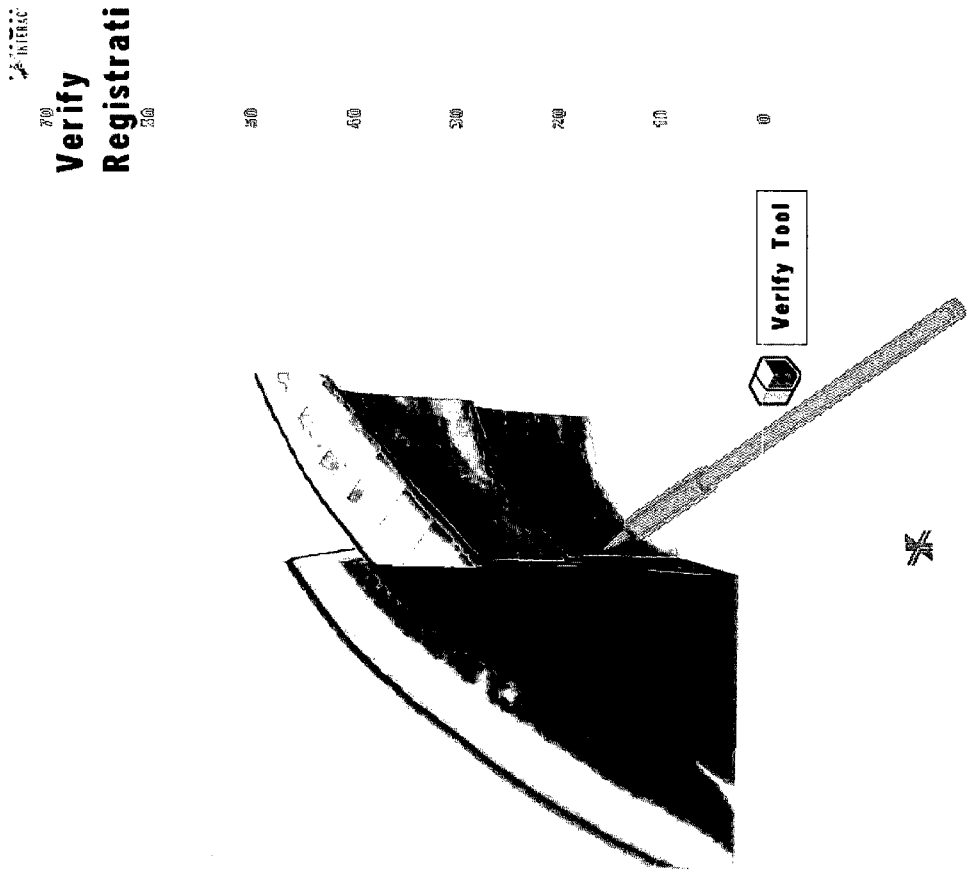

Finally, FIG. 24 depicts a magnified view of the back of the head using a front/back separation, and FIGS. 25 and 26 depict a left/right separation of the same area. FIGS. 27 and 28 depict a magnified portion of the view of FIG. 26, with variation in the location of the left/right separation plane within the magnified box.

The present invention has been described in connection with exemplary embodiments and exemplary preferred embodiments and implementations, as examples only. It will be understood by those having ordinary skill in the pertinent art that modifications to any of the embodiments or preferred embodiments may be easily made without materially departing from the scope and spirit of the present invention as defined by the appended claims.

What is claimed is:

1. A method of displaying 3D data, comprising:
    displaying at least one 3D data set defined by a 3D coordinate system;
    setting at least one boundary which divides said displayed at least one 3D data set into subregions, said subregions being bounded in said 3D coordinate system;
    assigning sets of display rules to each subregion, wherein said assigned sets of display rules are different from each other; and
    displaying said at least one 3D data set including said subregions according to said assigned sets of display rules;
    wherein said subregions are spatially separated by said at least one boundary and wherein said at least one boundary is interactively modifiable on said display of said at least one 3D data set including said subregions by a user.

2. The method of claim 1, wherein the 3D data set displayed in each subregion is the same.

3. The method of claim 1, wherein the 3D data set displayed in each subregion is unique to that display subregion.

4. The method of claim 3, wherein the 3D data sets displayed in each subregion are 3D scans of a human or animal body or portion thereof using different sensing modalities.

5. The method of claim 4, where said sensing modalities comprise one or more of CT, MR, PET, SPECT and US.

6. The method of claim 3, wherein the 3D data sets displayed in each region are surface renderings of polygonal data sets.

7. The method of claim 1, wherein the subregions comprise volumes, 2D surfaces, and points.

8. The method of claim 1, wherein the boundaries of at least one subregion define a rectangular crop box.

9. The method of claim 8, wherein there are two subregions whose boundaries have a common plane.

10. The method of claim 1, wherein a user can define one or more boundary planes that divide a given region within the 3D co-ordinate system into two or more subregions.

11. The method of claim 10, wherein the boundary planes are parallel to one or more surfaces of a 3D data set.

12. The method of claim 1, wherein the boundaries of the subregions and the set of display rules for each subregion are defined by a user.

13. The method of claim 12, wherein the boundaries of the subregions and the set of display rules for each subregion are defined by system defaults which can be modified by a user.

14. The method of claim 13, where a user defines or modifies said boundaries and/or display rules via an interactive object within the display.

15. The method of claim 13, where a user defines or modifies said boundaries and/or display rules via a mouse, trackball, joystick or other spatial 2D input peripheral.

16. The method of claim 12, where a user defines or modifies said boundaries and/or display rules via an interactive object within the display.

17. The method of claim 12, where a user defines or modifies said boundaries and/or display rules via a mouse, trackball, joystick or other spatial 2D input peripheral.

18. The method of claim 1, wherein when a user modifies the boundaries of a subregion, points in a 3D data set now located in a new subregion are displayed according to the display rules of said new subregion in substantially real time as the boundaries change.

19. The method of claim 18, wherein said variation of the boundaries of said subregions includes one or more of translation, rotation, scaling, shear, linear warping or non-linear warping.

20. The method of claim 1, wherein all voxels in the subregion need not be contiguous.

21. The method of claim 1, wherein the 3D data set displayed in each subregion is stored as one of volume raster data or geometric constructs.

22. The method of claim 1, wherein one or more 3D data sets are displayed in each subregion.

23. The method of claim 1, wherein the same 3D data set is displayed in each subregion.

24. The method of claim 1, wherein said subregions can be rotated or translated by a user within the 3D space defined by the 3D co-ordinate system.

25. A program storage device readable by a machine, tangibly embodying a program of instructions executable by the machine to implement a method of displaying 3D data, said method comprising:
    displaying at least one 3D data set defined by a 3D coordinate system;
    setting at least one boundary which divides said displayed at least one 3D data set into subregions, said subregions being bounded in said 3D coordinate system;
    assigning sets of display rules to each subregion, wherein said assigned sets of display rules are different from each other; and
    displaying said at least one 3D data set including said subregions according to said assigned sets of display rules;
    wherein said subregions are spatially separated by said at least one boundary and wherein said at least one boundary is interactively modifiable on said display of said at least one 3D data set including said subregions by a user.

26. The program storage device of claim 25, wherein the machine is either a computer or a data processor.

27. A method of displaying 3D data in a 3D display system, comprising:

loading at least one 3D data set into a 3D display system, each 3D data set being defined by a 3D co-ordinate system;

displaying at least one 3D data set;

setting at least one boundary which divides said displayed at least one 3D data set into subregions, said subregions being bounded in said 3D coordinate system;

assigning sets of display rules to each subregion, wherein said assigned sets of display rules are different from each other; and displaying said at least one 3D data set including said subregions according to said assigned sets of display rules;

wherein said subregions are spatially separated by said at least one boundary and wherein said at least one boundary is interactively modifiable on said display of said at least one 3D data set including said subregions by a user.

28. The method of claim 27, wherein one of the 3D data sets is displayed in each subregion.

29. The method of claim 27, wherein only one 3D data set is displayed in each subregion.

30. The method of claim 27, wherein in at least one subregion at least two 3D data sets are displayed.

31. A program storage device readable by a machine, tangibly embodying a program of instructions executable by the machine to implement a method of displaying 3D data, said method comprising:

loading at least one 3D data set into a 3D system, each 3D data being defined by a 3D co-ordinate system;

displaying at least one 3D data set;

setting at least one boundary which divides said displayed at least one 3D data set into subregions, said subregions being bounded in said 3D coordinate system;

assigning sets of display rules to each subregion, wherein said assigned sets of display rules are different from each other; and displaying said at least one 3D data set including said subregions according to said assigned sets of display rules;

wherein said subregions are spatially separated by said at least one boundary and wherein said at least one boundary is interactively modifiable on said display of said at least one 3D data set including said subregions by a user.

32. The program storage device of claim 31, wherein the machine is either a computer or a data processor.

* * * * *